United States Patent
Jacob et al.

(10) Patent No.: US 11,182,049 B2
(45) Date of Patent: Nov. 23, 2021

(54) GUIDED DRILLDOWN FRAMEWORK FOR COMPUTER-IMPLEMENTED TASK DEFINITION

(71) Applicant: SAP SE, Walldorf (DE)

(72) Inventors: Jaison Jacob, Kollam (IN); Kannan Presanna Kumar, Berlin (DE)

(73) Assignee: SAP SE, Walldorf (DE)

( * ) Notice: Subject to any disclaimer, the term of this patent is extended or adjusted under 35 U.S.C. 154(b) by 230 days.

(21) Appl. No.: 16/428,980

(22) Filed: Jun. 1, 2019

(65) Prior Publication Data

US 2020/0379609 A1   Dec. 3, 2020

(51) Int. Cl.
*G06F 3/0482* (2013.01)
*G06F 16/26* (2019.01)
*G06N 20/00* (2019.01)
*G06F 9/451* (2018.01)

(52) U.S. Cl.
CPC ............ *G06F 3/0482* (2013.01); *G06F 9/453* (2018.02); *G06F 16/26* (2019.01); *G06N 20/00* (2019.01)

(58) Field of Classification Search
CPC ........ G06F 3/0482; G06F 16/26; G06F 9/453; G06F 8/24; G06N 20/00
See application file for complete search history.

(56) References Cited

U.S. PATENT DOCUMENTS

2019/0042068 A1* 2/2019 Tompkins ........... G06F 3/04847

* cited by examiner

*Primary Examiner* — Andrey Belousov
(74) *Attorney, Agent, or Firm* — Klarquist Sparkman, LLP

(57) ABSTRACT

Techniques and solutions are described for configuring a computer-implemented process defined by a data model. The data model includes a plurality of data objects, each data object having an object type. Displays are rendered that request selection of first and second values for respective first and second data objects of first and second object types. The first and second values are assigned to the respective first and second data objects. The computer-implemented process defined by the data model is executed, using the first and second values, to provide execution results.

20 Claims, 14 Drawing Sheets

```
template <class output>
class AlgorithmInterface
{
412 ── private:
414 ──── string Name;
416 ──── algType Type;
       ── problemType probType;
420 ──── userLevel Level;         418
422 ──── type InputType;
       ── type OutputType;
424 ──── output algOutput;        422
       public:
428 ──── virtual void startAlgorithm () = 0;
430 ──── virtual void stopAlorithm () = 0;
432 ──── virtual void getStatus () = 0;
       ── virtual void getResults () = 0;
}                                 434
```
408

```
Class RandomForests : public AlgorithmInterface
{
    private:
412 ──── string Name = "Random Forests";
414 ──── algType Type = supervised;
       ── problemType probType = classification;
416 ──── userLevel Level = intermediate;    418
422 ──── type InputType = labelled;         420
       ── type OutputType = tree;
       ── output algOutput;
440 ──── int parameter1;                    424
440 ──── userLevel parameter1Level;         442
440 ──── int parameter2;                    442
       ── userLevel parameter2Level;
440 ──── int parameter3;                    442
       ── userLevel parameter3Level;
       ── int parameter4;
       ── userLevel parameter4Level;
428 public:
430 ──── void startAlgorithm (string jobName, string dataset, int parameter1, int parameter2, int parameter3, int parameter4);   448   440
432 ──── void stopAlgorithm (string jobName);          446
       ── void getStatus (string jobName, status &status);   446
       ── void getResults (string jobName, output &algOutput);
}                                                      446
```
438                                                    434

```
dataSet metaData         452
{
456 ── "name": "KannanData",
458 ── "type": "TABLE",  460
    ── "labelled": true,
    ── "columnTypes": "varChar(10), int, int, varChar(20),
                       varChar(20)",                  462
464 ── "date",
    ── "numberOfColumns": 5
    ── "numberOfRecords": 73,231,341
}
```
466

FIG. 4

GUIDED DRILLDOWN FRAMEWORK FOR COMPUTER-IMPLEMENTED TASK DEFINITION

FIELD

The present disclosure generally relates to configuring computer-implemented processes to guide a user through a task. Particular embodiments are described with respect to user interface displays that guide a user in configuring and executing a machine learning task.

BACKGROUND

Many computer-implemented processes can be very complex for users, particularly for new users or users who are operating in an area that is outside of their core area of expertise. Inefficient methods of guiding a user through a task can increase the time needed for the user to complete the task, as well contributing to the user's frustration. Particularly if the task is somewhat optional, a user may become frustrated to the point that they do not complete the task, or revert to a less efficient way of accomplishing the task. Task complexity can also increase the chances for task errors to occur, or for the task to be completed inefficiently using a computer. For example, if the task involves configuration settings or other parameters that may affect computer performance, user inexperience and frustration can result in excess computer resource use, such as processor use, execution time, memory resources, or network resources. Accordingly, room for improvement exists.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Techniques and solutions are described for configuring a computer-implemented process defined by a data model. The data model includes a plurality of data objects, each data object having an object type. Displays are rendered that request selection of first and second values for respective first and second data objects of first and second object types. The first and second values are assigned to the respective first and second data objects. The computer-implemented process defined by the data model is executed, using the first and second values, to provide execution results.

In one embodiment, a method is provided for configuring and executing a computer-implemented process defined by a data model. A data model is received that includes a plurality of data objects. Each data object has an object type. A first display is rendered, requesting selection of a first value for a first data object having a first data object type. The first display also provides a schematic diagram of the plurality of data objects in the data model. The first value is assigned to the first data object. A second display is rendered requesting selection of a second value for a second data object having a second data object type. The second display also provides the schematic diagram. The second value is assigned to the second data object. A computer-implemented process defined by the data model is executed using the first value and the second value to provide execution results. The execution results are displayed to a user.

In another aspect, another method is provided for configuring and executing a computer-implemented process defined by a data model. A selection of a data model type is received. The data model type is defined by a sequenced or hierarchical relationship of a plurality of data objects of a plurality of different data object types. A data model corresponding to the data model type is retrieved. A first display is rendered requesting at least a first value to be assigned to a first data object of the plurality of data objects. The first data object has a first type. The first display depicts the sequenced or hierarchical relationship of the plurality of data objects. A second display is rendered. The second display requests at least a second value to be assigned to a second data object of the plurality of data objects. The second data object has a second type. The second display depicts the sequenced or hierarchical relationship of the plurality of data objects. A computer-implemented process defined by the data model is executed using the at least a first value and the at least a second value. Execution results are displayed.

In a further aspect, a method is provided for configuring and executing a machine learning model. A selection of a task level is received. A plurality of machine learning models, stored in a repository, are determined that satisfy the selected task level. A selection of a machine learning problem type or a use case is received. At least one of the plurality of machine learning models that satisfies the problem type or the use case is determined. A representation of the at least one machine learning model is displayed. The representation illustrates a sequenced or hierarchical relationship between a plurality of components of the at least one machine learning model. At least a first component of the plurality of components represents a data set to be processed and at least a second component of the plurality of components represents at least one algorithm to be used to process the data set. Input specifying the data set is received. The specified data set is processed using an algorithm of the subset. Execution results are provided.

The present disclosure also includes computing systems and tangible, non-transitory computer readable storage media configured to carry out, or including instructions for carrying out, an above-described method (or operations). As described herein, a variety of other features and advantages can be incorporated into the technologies as desired.

BRIEF DESCRIPTION OF THE DRAWINGS

FIG. 4 presents example pseudocode for various components of a machine learning model.

DETAILED DESCRIPTION

Example 1—Overview

Figure 1:
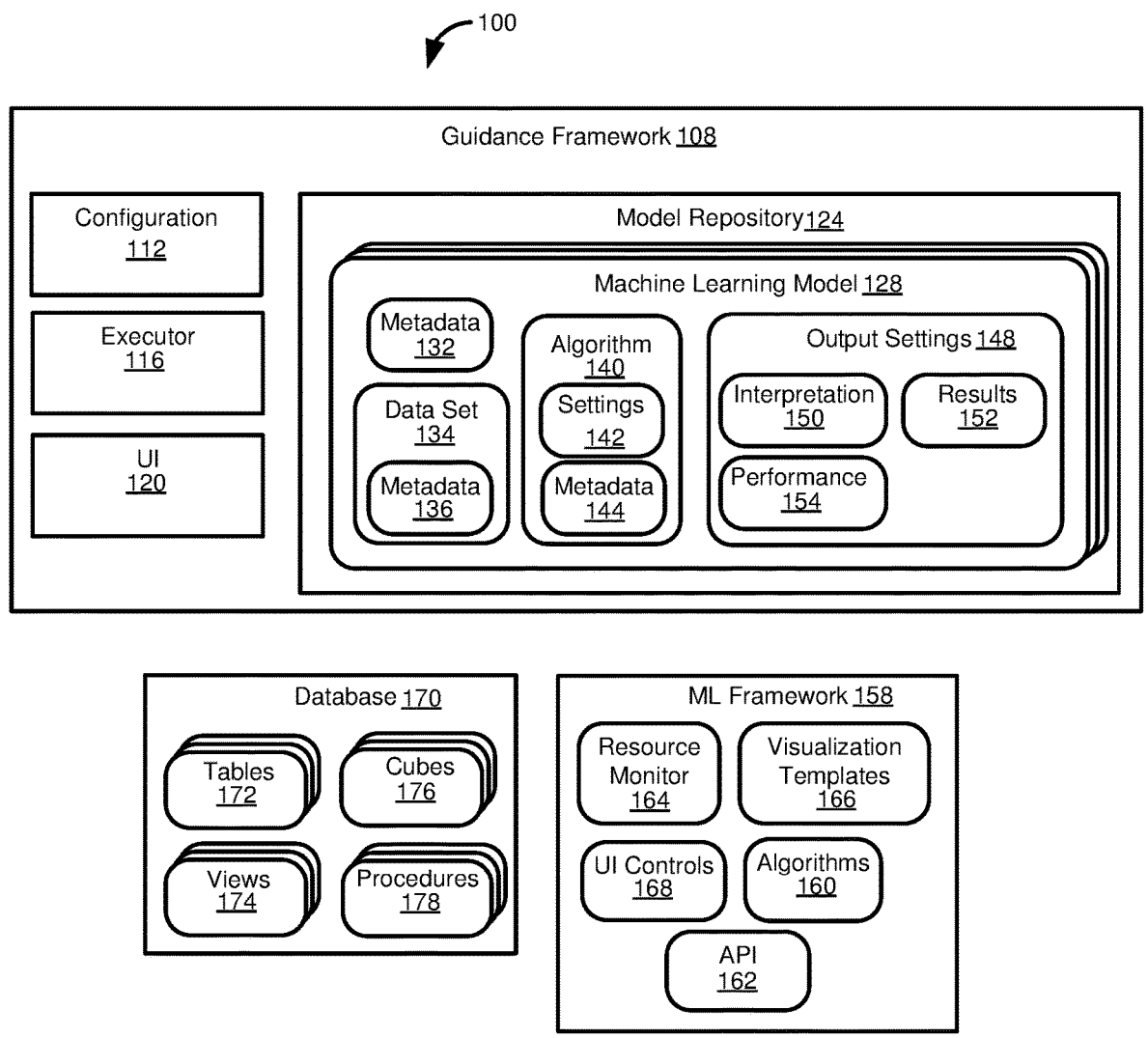
FIG. 1 is a diagram illustrating an example computing environment having a guidance framework in which disclosed embodiments can be implemented.

Many computer-implemented processes can be very complex for users, particularly for new users or users who are operating in an area that is outside of their core area of expertise. Inefficient methods of guiding a user through a task can increase the time needed for the user to complete the task, as well contributing to the user's frustration. Particularly if the task is somewhat optional, a user may become frustrated to the point that they do not complete the task, or revert to a less efficient way of accomplishing the task. Task complexity can also increase the chances for task errors to occur, or for the task to be completed inefficiently using a computer. For example, if the task involves configuration settings or other parameters that may affect computer performance, user inexperience and frustration can result in excess computer resource use, such as processor use, execution time, memory resources, or network resources. Accordingly, room for improvement exists.

As an example, machine learning is a topic that is of increasing interest to users who are not computer scientists, or even programmers or software developers. Some applications try and facilitate the use of machine learning techniques by creating libraries of machine learning algorithms, or by providing software that uses machine learning for a very specific application, such as an application that uses predefined data sets (e.g., a particular collection of database tables) to provide set output using a set of pre-defined parameters.

However, such software applications may be insufficient for many purposes. For example, it may be impractical for developers to provide predefined applications for every possible use case that may be of interest, particularly if users do not have data that is maintained in a standard format or has standard characteristics. Even for predefined tasks, if a user does not understand what they are doing, and where they are in an overall process, they may become frustrated. For many users, using machine learning techniques can be very beneficial, but may not be routine or required. Accordingly, if the user does not understand what they are doing, why they are doing it, or how many steps they have left, they may become frustrated, and possibly give up. Further, while presenting steps to a user one step at a time may be useful in guiding the user through a task, the user may be less likely to understand what they are doing, which may not facilitate their accomplishing new or more complex tasks, or trying variations for a task.

The present disclosure provides a guided drill down framework that can guide a user through a task that includes multiple steps and components. The guided drill down framework can include user interface displays that display options for a particular step or component in a process or model, but simultaneously also display a representation of the overall task or model configuration process, such as showing a representation of each task or model component (which can correspond to separate user interface screens which will be presented to a user during task definition). In this way, a user can better understand how a current user interface display, and configuration of a particular task or component, relates to an overall task. This understanding can facilitate the user in completing the task and understanding task parameters, which can help the user complete similar tasks in the future, modify the task, or generate or try new, possibly more complex, tasks.

In many cases, various parameters of a task may be mutually exclusive. Task steps or model components may be sequential, or have a hierarchical relationship. Accordingly, configuration of one task or model parameter may limit available options or values that can be used for other task or model parameters. The guided drill down framework can guide a user in completing the task by automatically restricting a user's selections for task parameters based on previously supplied user input. Or, the framework can determine whether a user's selection is consistent with prior selections. In the event a user makes a selection that is incompatible with a prior selection, a warning can be provided to a user, and optionally a suggestion provided of acceptable values.

At least some cases, a guided drill down framework can guide a user through task configuration or completion based on sequential or hierarchical task steps. That is, the user can be presented with user interface displays to complete task steps or configure components in order of the sequence or level of the hierarchy. In many cases, a user may be most confident in making selections for earlier task steps or components at a higher level of a hierarchy. By guiding a user through the task in a "drill down" manner, and presenting acceptable options or values to a user, the user can understand how later, or deeper hierarchical, steps or components relate to earlier steps or components, or steps or components at a higher hierarchical level.

Even with a guided drill down framework, many tasks may be so complex, with so many options, as to still be overwhelming to novice users. If software applications cater to users of one particular experience level, it can disadvantage other types of users. For example, software directed to a novice user may omit options that may be desired by a more sophisticated user. Accordingly, a disclosed guided drill down framework may adapt based on a user's experience level, or on a task level (i.e., a task complexity level, such as "advanced," "intermediate," "novice," etc.), which level can be explicitly set by or for a user, or which may be inferred through user input (for example, a user failing to select options or values for particular parameters, or selecting a "default" option). The options at one or more steps in a task, typically in a plurality of steps or all steps, can be tailored based on the experience or complexity level.

Disclosed technologies can find particular use in the field of machine learning. Even among computer scientists, developers, and programmers, machine learning can be a complicated and specialized field that may not be well understood outside of those who specialize in the area. Machine learning techniques are increasingly being applied to "practical" problems that may be of interest to enterprise users. However, outside of specially designed, special-purpose programs, it may be difficult for enterprise users to apply machine learning to problems that they face.

In the case of machine learning, a machine learning task may be defined by a process model, where the process model can have many steps or parameters, which can be represented by objects having various object types. Selection of a value or option for one step, or for one parameter, may limit options or values that can be selected for other steps or parameters. As an example, if a user selects a machine learning task relating to "classification," that may limit a set of algorithms that may be used with the task, data sets that can be used with the task, output views that are compatible with results produced by the task, etc. If a particular algorithm is selected, it may further limit what data sets can be used with the algorithm, other data processing that can be performed (e.g., sending the results of a first machine learning algorithm for processing by a second machine learning algorithm), or particular visualizations or output screens that can be used to present, and optionally interact with, results of the machine learning task.

Different process models can be created for users having different experience levels or for different complexity levels, or particular elements of a process model can be classified by user experience or complexity level such that a given process model can practically be used to define particular implementations of the process model for a given user experience or complexity level. Generally, more options are provided to users having greater levels of sophistication. For example, novice users may be given a more limited type of machine learning task to accomplish (for example, classification, but not clustering), may have the tasks presented in different manners (for example, rather than "classification," a task may be defined with respect to a particular type of data or result to be provided, such as classifying individuals as productive or unproductive). Particularly when provided with other disclosed features, such as a guided drill down approach, providing process models for different experience levels can help a user learn a task such that the user can progress to higher levels of task complexity.

Disclosed technologies can provide various advantages. One or more of using a guided approach, a drill down approach, or an approach that provides different process models for users have different experience levels, or for different complexity levels, can facilitate a user learning how a task is solved, which can allow them to configure tasks more efficiently or progress to more complex tasks. By reducing user frustration, these approaches can also improve the user's experience in task definition and execution, and help to improve the level of use of task definition and execution tools, and improving user completion rates (that is, reducing the number of users who fail to complete a task definition).

Process models can also reduce programming effort, and also storage requirements, since a given process model can be implemented/configured in multiple ways. So, rather than having different models for each set of task parameters, a single process model can be dynamically configured as needed for a given situation. In cases where less sophisticated users may be configuring a task, having process models that have some steps or parameters configured with default values, or not being changeable (or perhaps even visible to) an end user can help avoid configuration errors or configurations which might be less efficient. Thus, disclosed technologies can improve computer resource use, such as having a task use less CPU cycles, memory, or network resources.

Example 2—Example Computing Environment with Guidance Framework

FIG. 1 illustrates components in an example computing environment 100 in which disclosed technologies can be implemented. At a high level, the computing environment 100 includes a guidance framework 108 that can be used to create and execute process models, such as process models in the form of machine learning models 128. The computing environment 100 also includes a machine learning framework 158 that can be called to execute instances of machine learning models 128, and one or more data sources, such as a database 170.

The guidance framework 108 can include a configuration component 112. The configuration component 112 can be used to create instances of a machine learning model 128, such as choosing particular options for a particular model, or particular values for model parameters, as will be further described. In some cases, the configuration component 112 can also be used to define or edit machine learning models 128.

The guidance framework 108 can include an executor 116. The executor 116 can manage execution of a particular instance of a machine learning model 128, such as after a user has configured the model using the configuration component 112. The executor 116 may access the machine learning framework 158 in order to execute an instance of a machine learning model 128, such as by calling an API 162. In some cases, the executor 116 may be configured to access multiple machine learning frameworks 158, such as by calling an API 162 of a machine learning framework 158 desired to be used by a user, or as specified in an instance of a machine learning model 128.

The guidance framework 108 can include a user interface 120. The user interface 120 may include a plurality of user interface screens configured to guide a user through a configuration process using the configuration component 112. The user interface 120 may also provide user interface screens to allow a user to execute a machine learning model, to view the status of a machine learning task being executed, or to view execution results.

The machine learning model 128 includes various objects, which can also be referred to as component or entities, that define the machine learning model, including specifying how a machine learning task will be conducted, and a plurality of sub-components or sub-entities, which also can be objects, to be configured by a user for a particular task. The objects can be associated with specific and discrete types, such as a data set type, an algorithm type, or an output settings type. The machine learning models 128 can be stored in a repository 124. As will be further described, a user may browse at least a portion of the repository 124, select a particular machine learning model 128 for use, and then configure and execute the model using the configuration component 112 and the executor 116.

The components of (e.g., represented by objects in) the machine learning model 128 can be categorized according to the different functions they serve. For example, the components can be categorized into inputs, outputs, and processing components that read inputs, perform processing, and provide outputs. A given object or component may have one or more subobjects or subcomponents, as will be further described.

A machine learning model 128 can include a metadata object type 132. The metadata object 132 can describe various features of the machine learning model, such as one or more types associated with the machine learning model. A type can be a type of problem the model is intended to be used with, such as whether the model relates to a classification problem or a clustering problem. The type can also refer to whether the machine learning model 128 is associated with one or more general machine learning techniques, such as supervised learning, unsupervised learning, semi-supervised learning, or reinforcement learning.

The metadata object 132 can include identifiers for various use-cases where a machine learning model 128 can be useful, such as image recognition, text recognition, or particular elements of enterprise resource planning software, such as demand forecasting. The metadata object 132 may include identifiers for particular types of users for which the machine learning model 128 may be useful, such as a user having a particular title or role. That is, for example, a given machine learning model 128 may generally be useful for manufacturing or production, but not as useful for distribution. The metadata object 132 can also include an identifier indicating the relative complexity level of a given machine learning model 128 relative to other machine learning models (i.e., can provide an ordering or ranking). Examples of different identifiers can be "high, medium, low," "expert, intermediate, novice," or "1, 2, 3." In some cases, an identifier can be tied to other metadata components. For example, a particular machine learning model may be "easy" if used by a user having a particular role, but may be "hard" if used by a user having a different role.

The metadata object 132 can serve additional purposes, such as to describe the components used in the machine learning model, the number of such components in the model, or the relationship between the components.

The machine learning model 128 can include one or more data set objects of a data set object type 134. A data set object type 134 can include metadata 136 that describes features that should be associated with data sets that are useable with a given machine learning model 128. For example, the metadata 136 can specify a particular type for the data set, such as a format type (e.g., XML, JSON, CSV, tabular), or a type associated with a particular software application (e.g., a file type). The metadata 136 can specify a minimum or maximum number of data items (e.g., a number of records). The particular properties can include additional features, such as requiring a particular attribute be present in the data set or an attribute that can be mapped to a particular element of another component of a machine learning model 128. For example, the metadata 136 can specify that a particular attribute of the data set be specified as a label for corresponding data values.

The metadata 136 can specify how a data set object 134 interacts with other components of a machine learning model 128, such as with one or more algorithm objects 140 or one or more output settings objects 148 (e.g., that define output settings or parameters for the machine learning model) included in the machine learning model. For example, metadata 136 can specify what kind of algorithm objects 140 or output settings objects 148 can be used with a particular data set object 134.

During user configuration of an instance of the machine learning model 128, the user can assign one or more data sources to the data set 134. For example, a user may select a particular file, file path, URI, or other indicator of a data source to be used. In many instances, the data source will include data stored in a database. In this scenario, a user can specify particular data to be used using a query language statement, such as a query language statement to retrieve data to be used in the data set object 134. Optionally, the user can specify how data from a data source will be processed or selected for use in the data set object 134, such as specifying filter criteria, formatting operations, aggregation operations, or calculations to be performed using data from a data source, where the results are to be included in the data set object. In at least some cases, this processing can be specified as part of a query language statement that retrieves data from a database.

The machine learning model 128 can include one or more algorithms associated with an algorithm object type 140. An algorithm object type 140 can be associated with metadata 144. The metadata 144 can specify what types of algorithm objects 140 can be used in a particular machine learning model 128, including based on particular data set objects 134 or output settings objects 148 available for the machine learning model, generally, or data set objects or output settings objects that have been selected for a particular instance of the machine learning model 128. That is, like other components of the machine learning model 128, a particular machine learning model may restrict what data sets 134 (or data set properties) can be used with the model, what algorithm objects 140, or values or settings for such objects, can be used with the model, and what output settings objects 148, or values or settings for such objects, can be used with the model. Selections made for a given instance of a machine learning model 128 may further restrict what algorithm objects 140 can be used. For instances, a given machine learning model 128 may have already had one or more data set objects 134 selected (or configured), or one or more output settings objects 148 selected (or configured). Some of the algorithms that otherwise may have been useable in an instance of the data model 128 may not be compatible with such selections, and the metadata 144 can indicate dependencies between an algorithm object 140 and data set information or information regarding output parameters.

An algorithm object 140 can be associated with one or more objects of a setting information object type 142. A setting information object 142 can represent a subcomponent or subentity of a machine learning model 128. Each algorithm object 140 can be associated with its own setting information. Thus, the selection of an algorithm object 140 dictates at least in part what setting object 142 may be available, or how they can be configured. The setting information object 142 can also depend on other factors, such as a level (e.g., "expert" or "novice") associated with the machine learning model 128, or other information. In some cases, setting information objects 142 may be set for a given algorithm 140 object, and made visible to a user, but not changeable by a user. Or, all or a portion of the setting information 142 can be made visible to the user, and at least a portion of the setting information can be set or altered by a user. For example, some elements of the setting information object 142 can represent default values. Setting information objects 142 can be restricted or set based on other factors, such as a particular use case selected by a user, a particular data set object 134 selected for use, or particular output parameters of an output settings object type 148 selected for use.

Output settings specified in an instance of an output setting object type 148 can influence what data is output by an algorithm object 140, how the data is formatted, how the data is interpreted, or how the data is displayed. Data output by an algorithm object 140 can include results, but can also include information regarding the operation or performance of the algorithm, such as confidence values or weighting values determined during execution of the algorithm, as well as information regarding the efficiency or computer resource use of the algorithm.

Specifically, the output settings objects 148 can include interpretation settings in an interpretation settings object type 150. The interpretation settings used in an instance of the interpretation settings object type 150 can be based on a particular application or data set object 134 used by the algorithm. For example, data regarding a manufacturing process may be interpreted differently than data relating to distribution of goods. The interpretation setting objects 150 can, among other things, specify particular user interface screens or user interface elements that will be presented to a user to help the user interpret the results of an algorithm associated with an algorithm object 140.

The output settings objects 148 can also include results settings in an instance of a result settings object type 152. Results settings in a result settings object type 152 can indicate what results of an algorithm in an algorithm object 140 should be output, and how the output should be formatted or displayed. Results output in accordance with the result setting objects 152 can be related to an interpretation provided by the interpretation setting objects 150. However, in general, the results setting objects 152 describe "raw" results provided by the algorithm object 140, as compared with the interpretation setting objects 150, which influence how the results are explained to the user.

The output settings objects 148 can include performance settings in a performance settings object type 154. The performance settings object can be used to specify output to be provided to a user regarding the performance of an algorithm object 140 or the performance of one or more computing devices while executing the algorithm. Algorithm performance information can include error statistics or confidence statistics. Resource information can include a total algorithm execution time, a number of iterations performed, or information regarding CPU, memory, or network use.

Although shown as including a single instance, at least some components (or sub-components) of a machine learning model 128 may have multiple instances. For example, multiple data set objects 134 can be accessed by a single instance of a machine learning model 128. Or, one or more data set objects 134 may be analyzed using multiple algorithm objects 140. For example, results of a first algorithm object 140 may be further analyzed using a second algorithm. In the event that there are multiple data set objects 134 or multiple algorithm objects 140 used, it may be useful to have multiple instances of the output settings objects 148.

The computing environment 100 can include components for use in creating a machine learning model 128, instantiating a machine learning model, or executing a machine learning model. For example, a machine learning model 128 can be accessed by a machine learning framework 158. The machine learning framework 158 can include, for example, algorithms 160 specified by the algorithm setting objects 140 of a machine learning model 128. When an instance of a machine learning model 128 is executed, algorithms 160 specified in the instance can be called to process data specified by a data set object 134. The machine learning framework 158 can include an API 162 that includes methods for accessing the algorithms 160, such as for initiating processing of a data set object 134 using an algorithm, setting algorithm parameters, monitoring algorithm execution, or retrieving execution results.

The machine learning framework 158 can include a resource monitor 164. The resource monitor 164 can monitor computer resource use during execution of an instance of a machine learning model 128, including so that performance results can be provided as specified by the performance settings 154. The machine learning framework 158 can include components to assist in formatting, displaying, or interpreting results of an algorithm 160. These components can include visualization templates 166. The visualization templates 166 can include templates for visualizations such as scatter plots, bar charts, area charts, line charts, histograms, pie charts, tree maps, fishbone diagrams, or matrix diagrams. The visualization templates 166 can be associated with metadata indicating particular types of algorithm objects 140 or categories of machine learning tasks with which a particular visualization template might be used. The API 162 can include methods for calling a visualization template 166 and generating a visualization using a template. The API 162 for visualization can be used by external components, such as the output settings objects 148 of the machine learning model 128, but also by other components of the machine learning framework 158.

The machine learning framework 158 can include user interface controls 168, which in at least some cases can include all or a portion of an entire user interface screen. User interface controls 168 may be components that facilitate configuring or executing an algorithm 160, selecting or interacting with a visualization template 166 (or a visualization generated using such a template), or for viewing information associated with the resource monitor 164.

Although a single machine learning framework 158 is shown, in some aspects, a computing environment 100 can include multiple machine learning frameworks, which frameworks may be configured as shown for the framework 158, or may be configured differently in whole or part. In at least some cases, a machine learning model 128 can be at least partially decoupled from a particular machine learning framework 158. For example, a machine learning model 128 can be executed using different machine learning frameworks 158 by accessing the respective API of such frameworks.

The computing environment 100 can include one or more data sources, such as data sources that hold data specified by a data set object 134 of an instance of a machine learning model 128. For example, the computer environment 100 includes a data source in the form of a database 170. The database 170 can store various objects, such as a plurality of relational database tables 172. One or more views 174 may be defined with respect to the tables, as may one or more cubes (e.g., OLAP cubes). In some cases, a cube 176 can exist as an instantiated object with materialized data, while in other cases a cube can define a schema that is in turn defined with respect to the tables 172 or the views 174. The database 170 can include additional features, such as one or more stored procedures 178. In some cases, a stored procedure 178 can be used as part of pre-processing a data set specified in a data set object 134 prior to the data set being processed using a machine learning algorithm 160. Or, a stored procedure 178 may be called to process final or intermediate results produced by an algorithm.

Although the computing environment 100 is described with respect to a machine learning model 128 as the process model, elements of the computing environment 100 can be adapted for use with other types of process models. Generally, the components shown in the computing environment 100 can be adapted to use such different types of processing. For example, various process models for a particular type of process may have a structure similar to that of the machine learning model 128, where objects for various component or entities that should be defined for the process model are included in the template. These components or entities can specify permitted values or options, including accounting for dependencies between components or entities, such that a selection made for one component or entity may restrict options that can be selected for, or values assigned to, other components or entities. Rather than a machine learning framework 158, another type of process execution framework can be accessed in order to carry out a process defined by a particular instance of a process model.

Example 3—Example Algorithm Library

Figure 2:
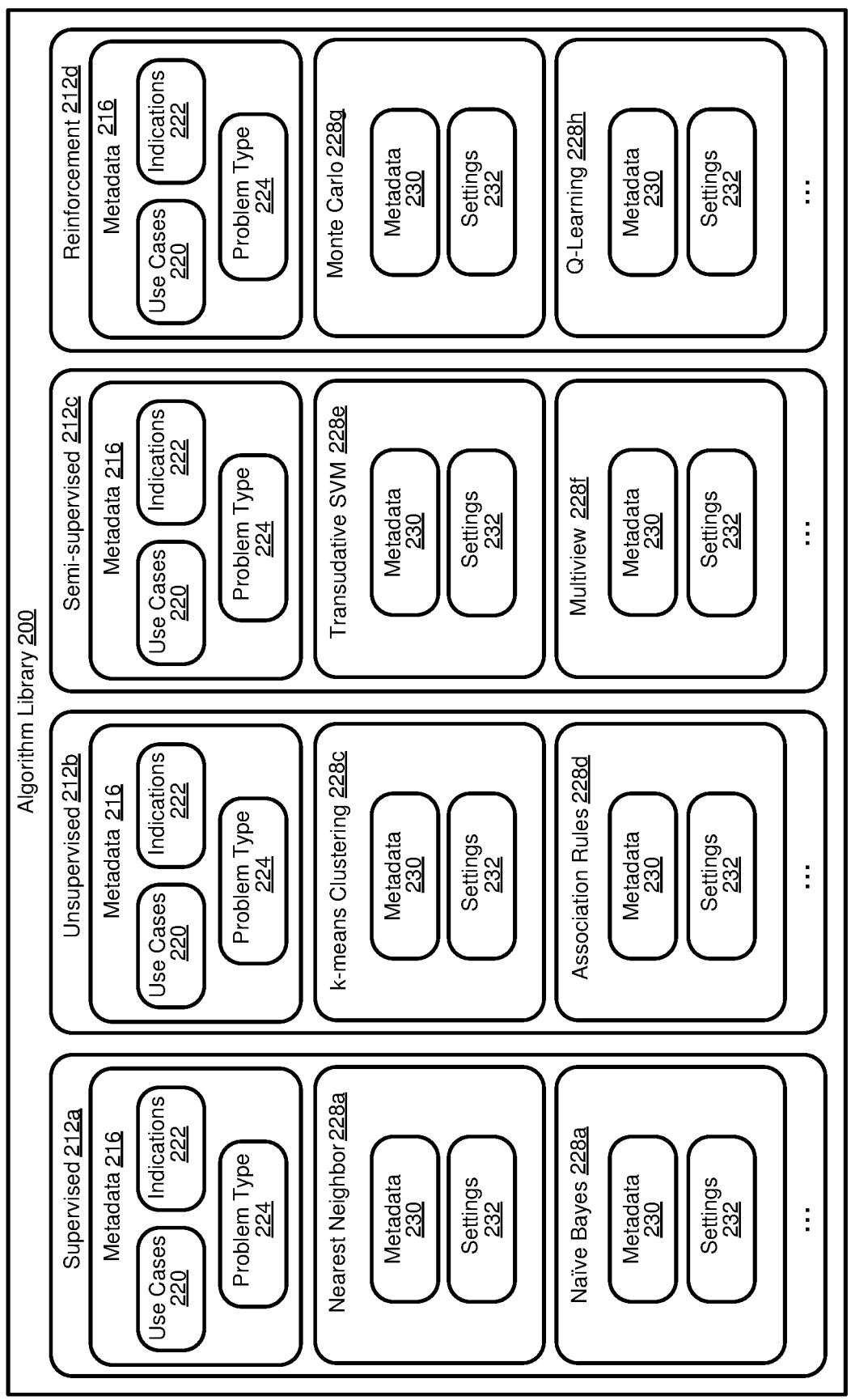
FIG. 2 is a diagram illustrating an example of an algorithm library.

FIG. 2 illustrates an example of an algorithm library 200. The algorithm library 200 can be an example of algorithm objects 140 that can be selected (or available for selection) in a machine learning model 128 of FIG. 1. Similarly, the algorithm library 200 can be an example of algorithms 160 available in a machine learning framework 158, which can correspond to the algorithms in the algorithm objects 140.

The algorithm library 200 can include various categories 212 of algorithms, shown as categories 212a-212d. For example, the algorithm library 200 is shown with categories corresponding to supervised techniques 212a, unsupervised techniques 212b, semi-supervised techniques 212c, and reinforcement learning 212d. Each category 212 can be associated with metadata 216. The metadata 216 can include a use case component (or object) 220, which includes identifiers for various use cases where an algorithm in the category 212 may be useful. For example, a use case 220 may be "manufacturing," or "manufacturing fault analysis."

The metadata 216 can include indications, such as in an indications object type 222, where an indication may include requirements or conditions. For example, a given category 212 may require a particular type of data, such as labelled data or numerical data. Or, a category 212 may require a set of training data before algorithms can be used with a set of data to be analyzed. A guidance framework, such as the guidance framework 108 of FIG. 1, can use the indications 222 to help determine what selections can be made when instantiating a machine learning model 128.

The indications 222, or other elements of the metadata 216, can specify what category, user types, etc. for which algorithms in the category 212 may be available, or for which they may be most useful. For example, one category 212 may have indications 222 specifying that the category has algorithms that are suitable for novice users, intermediate users, and expert users. Another category 212 may have indications 222 specifying that the category only has algorithms suitable for intermediate users and expert users.

The metadata 216 can include problem type metadata, such as in a problem type object type 224. Problems types can include types such as "classification" or "clustering." The problem type object 224 may be used by the guidance framework 108 to help determine what selections for an instance of a machine learning model 128 are displayed as available options, or whether selections are valid. The metadata 216 can include additional elements. For example, the metadata 216 can include an element describing the category 212 to which it applies.

Each category 212 of algorithms can include one or more algorithms 228, shown as algorithms 228a-228h. An algorithm 228 generally includes metadata 230 (which can be an object for metadata for algorithms) and one or more settings 232 (which can be maintained in an object of a settings object type). The metadata 230 can be similar to the metadata 216, including having elements (not shown) that describe use cases, indications, and problem types associated with an algorithm 228. In particular, the metadata 230 can specify what type of users may access a particular algorithm 228, such as whether the algorithm 228 is suitable for use by novice, intermediate, or expert users. The metadata 230 may also specify settings 232 that are available for selection or configuration for different levels of users, or supply default values for a setting. In other cases, the settings 232 may themselves have metadata, which can specify categories of users for which the setting will be displayed, or default values.

When a machine learning model is defined, such as a machine learning model 128 of FIG. 1, the template for the model can specify which category 212 the model is defined for, or can specify use cases, indications, or problem types that can be compared with metadata 216 of the different categories 212 to help determine which categories may apply to a given model. Similarly, the machine learning model 128 can directly specify one or more algorithms 228, or information provided for the model may be compared with the metadata 230 to determine which algorithms may be appropriate for use with the model. When a machine learning model is processed using the configuration component 112, a user may be prompted to select a category 212, or to provide information useful to determine one or more categories, from which the user may then select. Once the category 212 is selected, the machine learning model, the selected category, and any other information regarding the user or use case may be used to display available algorithms to a user, where the user can select an algorithm to be used with a particular instance of the machine learning model. Any settings 232 which are required to be configured by a user, or which the user has the option to change, can be conveyed to the user. Once a user has configured an algorithm 228, and selected other components of a machine learning model, such as the data set object 134 and the output settings objects 148, the algorithm 228 can be executed and results provided to the user.

Example 4—Example Object Hierarchy

Figure 3:
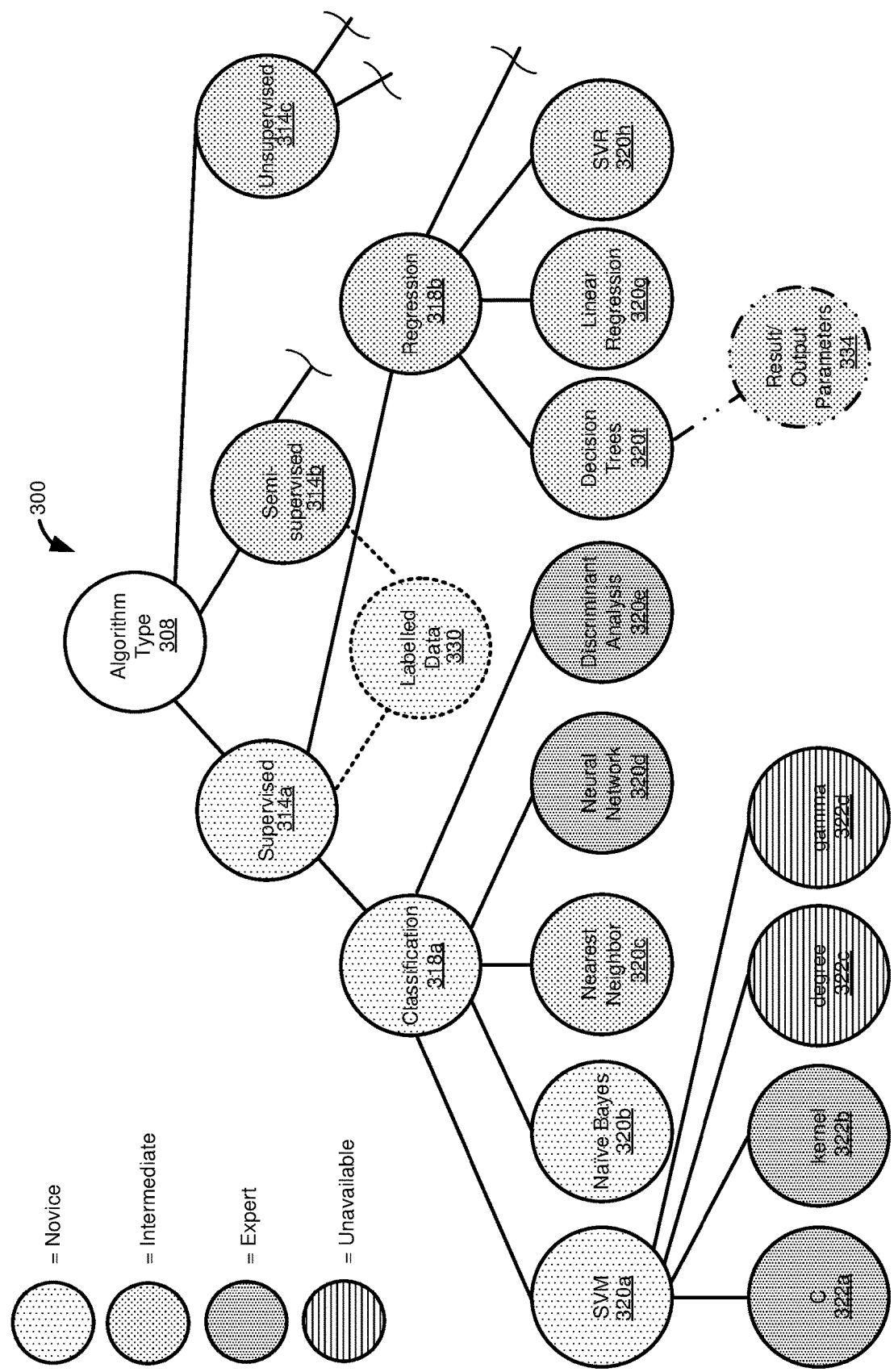
FIG. 3 is a schematic diagram illustrating hierarchical relationships between components of algorithms and other components of a data model.

FIG. 3 is a diagram illustrating a hierarchy 300 that can be used to describe elements of a machine learning model. In particular, the hierarchy 300 illustrates how selections made at one level of the hierarchy can affect choices available at other levels The hierarchy 300 can include a root node 308, where a selection can be made at a first level of the hierarchy of a particular class 314 of algorithms, shown as classes 314a, 314b, 314c. Children of a class 314, at a second level of the hierarchy 300, can represent particular types 318 of algorithms (shown as types 318a, 318b) in the corresponding class 314. Note that selection of either a type 318 or a class 314 restricts other available options, even if the hierarchy 300 is not entered (e.g., a machine learning model is not configured from) the root node 308. That is, selecting the "supervised" class 314a restricts the available types to "classification" 318a and "regression" 318b. Correspondingly, in some cases, "regression" 318b might be selected initially, thus setting a traversal through the hierarchy 300 such that only options satisfying "regression" 318b and "supervised" 314a are available or valid.

The children of the second level of the hierarchy 300, at a third level, can correspond to particular algorithms 320, shown as algorithms 320a-320h. As before, selections made at a higher level in the hierarchy 300 restrict selections available at the third level. For example, if "classification" 318a is selected, then at most algorithms 320a-320e would be available. That is, as has been described, the experience level of a user, or a similar parameter, may be used to further restrict algorithms 320 that are made available, as will any selections regarding a use case or data set for use with a particular instance of a machine learning model.

The final, fourth level of the hierarchy 300 corresponds to settings 322 of a particular algorithm 320a. For convenient presentation, only settings 322a-322d of algorithm 320a are shown. Some or all of the settings 322 may be made available to a user or displayed to a user. Similarly, in some cases, default values may be provided for some of all of the settings 322. Generally, as a user becomes more experienced, they can choose machine learning models that makes a greater number of settings 322 available for a user to modify.

FIG. 3 also illustrates how different component or object types of a machine learning model can be related. For example, as described above, a particular data set may be useable with some machine learning algorithms, but not others, and may be associated with metadata describing algorithms with which the data set can be used. A metadata tag 330 can be provided representing labelled data, and can be associated or linked with supervised algorithms 314a and semi-supervised algorithms 314b. Correspondingly, a metadata tag (not shown) for unlabeled data would not be linked to the supervised algorithm category 314a. Similarly, result or output parameters, or metadata for such parameters can be associated with other object types, such as algorithms or data set characteristics. As shown, particular result/output parameters 334 can be associated with a decision trees algorithm 320f.

As described above, objects in the hierarchy 300 can be associated with a complexity level. In at least some cases, a complexity level for a particular instance of a machine learning model will retrieve objects associated with that complexity level or a lower complexity level. For example, an "intermediate" complexity level will retrieve "intermediate" objects as well as "novice" objects. However, the technology can be implemented in a different way, such as a complexity level only retrieving objects of that complexity level. This can be useful, such as in cases where objects or settings for different complexity levels may be inconsistent or incompatible.

Example 5—Example Code for Model Object Types

Components of a machine learning model can be stored in various types of representations, including as records in database tables, metadata descriptions (including in XML or JSON format), or as classes or similar abstract data types. FIG. 4 provides a pseudocode description of various model components.

In particular, code fragment 408 represents an example class that defines an interface for an algorithm. That is, the interface defines properties that any algorithm in the class must implement. The interface fragment 408 includes a data member 412 for a name (e.g. "naive Bayes"), a data member 414 for a type (e.g., "supervised," "unsupervised"), a data member 416 for a problem type (e.g., "classification," "clustering"), a data member 418 for a user level (e.g., "novice," "expert"), a data member 420 for an input type (e.g., "labelled," "unlabeled," "numeric," "string"), a data member 422 for an output type (e.g., "numerical matrix," "array of strings," "naive Bayes," "clustering"), and a data member 424 to actually hold output results of an instance of the algorithm.

In the case of an abstract data type, the code fragment 408 can declare methods that can be called to execute an instance of the algorithm. For example, a method 428 can be called to start an algorithm, a method 430 can be called to stop execution of the algorithm, a method 432 can be called to get a current status of the algorithm, and a method 434 can be called to get the results of algorithm execution.

Code fragment 438 provides a declaration of a class for a particular algorithm, random forests, that implements the interface of the code fragment. The code fragment 438 includes the data members 412, 414, 416, 418, 420, 422, 424, but has values assigned to the variables that are appropriate for the random forests algorithm. For example, the data member 412 has been assigned a value of "Random Forests," while values for data members 414, 416 indicate that the algorithm is a supervised machine learning algorithm that can be used to solve classification problems. The value for the data member 418 indicates that the algorithm is of an intermediate level. So, typically the random forests algorithm would be available for use by intermediate and higher users (e.g., intermediate and expert users), but not by users of lower than intermediate level, such as novice users. Data members 420, 422 have been assigned values indicating that the algorithm requires labelled data, and that the output of the algorithm is a tree data structure.

The code fragment 438 for the random forests class adds additional data members 440, 442. The data members 440 correspond to integer values for settings associated with the random forests algorithm. The data members 442 can specify a user level associated with a respective setting data member 440, which can be used to determine which settings will be displayed to a user or available for modification by a user.

The methods 428, 430, 432, 434 are present in the code fragment 438, but have been modified to provide specific implementations of the interface methods. In particular, the method 428 to start an instance of the algorithm includes arguments of a job name or identifier 446 (e.g., for identifying the job on a system where the algorithm is being executed), a data set identifier 448 (e.g., for identifying a data set to be retrieved, or a data structure that includes data to be operated on by the algorithm), and the data members 440 corresponding to the algorithm settings. The methods 430, 432, 434 are shown as having the job name 446 as an argument.

Code fragment 452 represents a metadata definition of a data source. The code fragment 452 can be a JSON representation of a data source. The code fragment 452 includes key-value pairs for properties such as a data set name 456, a data set type 458 (e.g., table, CSV file, spreadsheet file), a flag 460 indicating whether the data set is labelled, data types 462 of columns included in the data set (if the code fragment 452 is for a representation of a data set type that includes columns), a number of columns 464 in the data set, and a number of records 466 in the data set. Metadata definitions of data sources can be different based on the nature of the data source, and, more generally, can include more, fewer, or different properties than shown. For example, a data source definition can specify algorithms, or classes of algorithms for use with the data source, or particular use case scenarios or problem types with which the data set may be used.

Example 6—Example User Interface Screens for Model Selection, Configuration, and Execution FIGS. 5-9 are example user interface screens 500, 600, 700, 800, 900 that can be present to a user to help guide the user through selecting, configuring, and executing a machine learning process, such as a process that is based on a machine learning model 128 of FIG. 1. The user interface screen 500 can be a screen initially presented to a user to define an instance of a machine learning problem, such as an instance of a machine learning model 128. The user interface screen 500 can include a control 508 that allows a user to select whether to use a guided analysis, such as according to a disclosed technology, or whether, for example, the user wishes to manually define a machine learning task. If the user has set the control 508 to provide a guided analysis, additional user interface elements can be provided to allow the user to select a particular machine learning task associated with a particular machine learning model 128.

In particular, a user may enter a level, such as "beginner," "intermediate," or "expert" in a field 512. Alternatively, radio buttons, a drop-down menu, or similar controls could be provided to allow a user to select a level. As explained, the level can be used to restrict what machine learning models 128 will be available to a user, or optionally components of models that will be available for user configuration. A user may be permitted to select a field of use in a field 514. For example, a field may be "manufacturing," "distribution," or another identifier of a particular field of use/use case scenarios that are of interest to a user. In at least some cases, the fields of use available for selection for the field 514 can be limited based on the level provided in the field 512. For example, each experience level may correspond to a definition, such as defined in a schema or an abstract data type, that specifies what fields of use are available for that experience level.

A user may select a problem type in field 516. As shown, a popup menu 518 can list available problem types. The available problem types can be limited at least in part based on other user selections, such as the experience level provided in the field 512, the field of use provided in field 514, or based at least in part on both of these factors.

A preview and workflow panel 520 can provide visual representations 524 of machine learning models that are available. The visual representations 524 can be filtered or generated, at least in some cases, based on user selections made for the fields 512, 514, 516. In other cases, the visual representations 524 can be provided even if not valid under current user selections, but such visual representations can be displayed in a manner to illustrate that they are currently not valid selections based on the user input. For example, the visual representations 524 that are incompatible with current selections can be displayed as grayed out.

The visual representations 524 can be helpful, as they provide an indication to a user of how complex a particular machine learning model is, and accordingly how complex it will be, or how much time it will take, to configure and execute a particular machine learning task. In at least some cases, elements 526 of a visual representation 524 can depict particular objects, components, or subcomponents of a machine learning model, and can represent interactions or relationships between such objects, components, or subcomponents. For example, elements 526 can be shaped, colored or otherwise shown in a manner to distinguish between data sets, algorithms, or output parameters. Similarly, subcomponents such as algorithm settings and different types of output parameters can be visually distinguished. Displaying such information can assist a user in better understanding how various components of a machine learning model are used and relate to each other, which can make configuring the task easier and less error prone. In addition, as the user is learning more about machine learning, the user may be able to progress to more complex tasks (e.g., they may move from a beginner level to an intermediate level, or from an intermediate level to an advanced level).

Once the user has selected a particular machine learning model, such as through selections made through the user interface elements 512, 514, 516, or, in at least some cases, selection of a visual representation 524, the screen 500 can be replaced with the screen 600. The user may also be provided with navigation options to move to a different screen, or to help the user understand a workflow involved with configuring and executing a task, including how a current step/user interface screen relates to other steps. In particular, the screen 500 can provide navigation links 530 that describe steps in the workflow and which optionally can be selected to move to a corresponding workflow step, such as to a user interface screen associated with the associated workflow step. As shown, navigation link 530a is shown as highlighted (e.g., by underlining), indicating that it is the active step/the screen 500 relates to this step.

Figure 5:
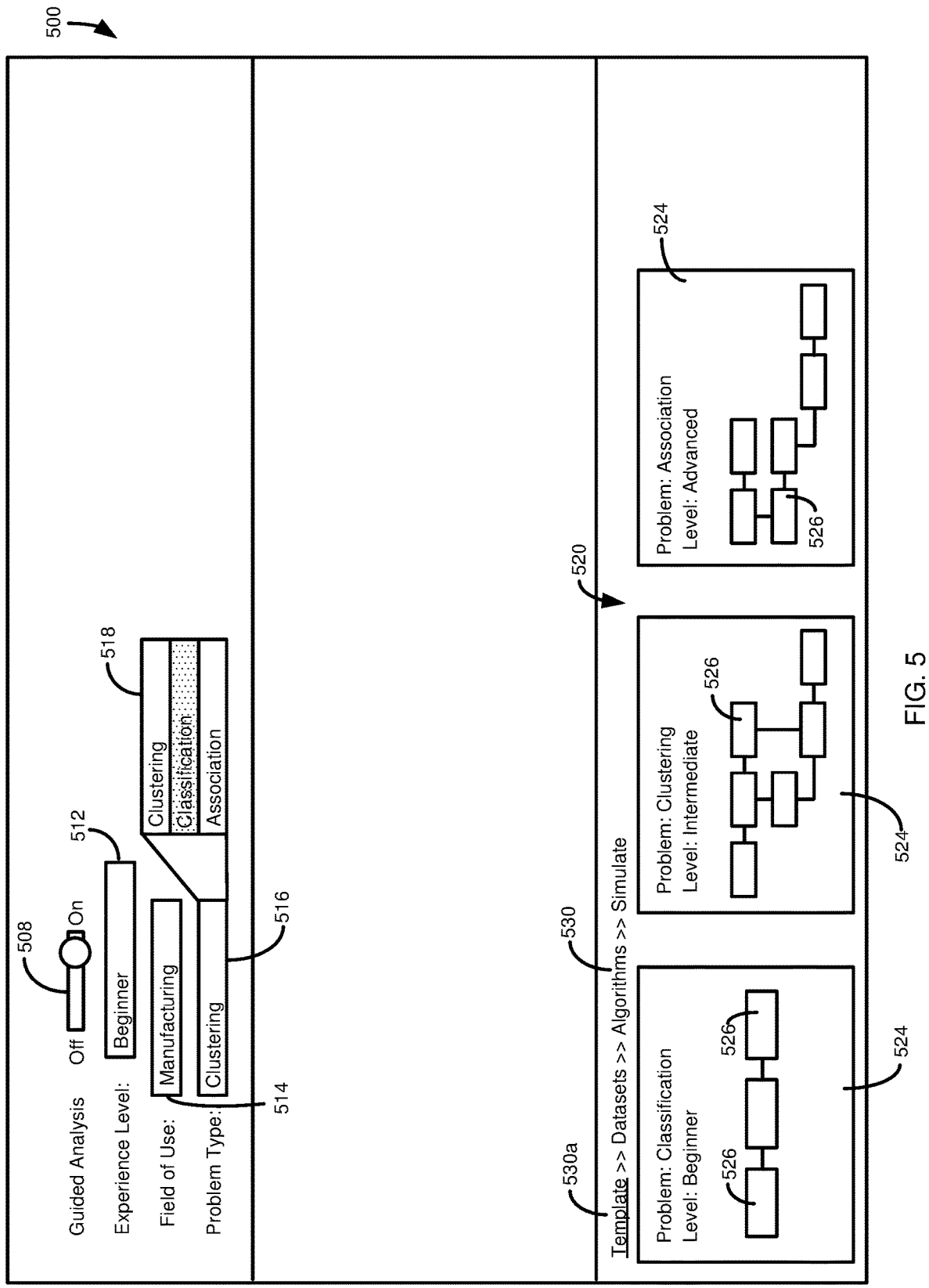
FIGS. 5-9 are example user interface screens useable to select, configure, and execute a machine learning model.
Figure 6:
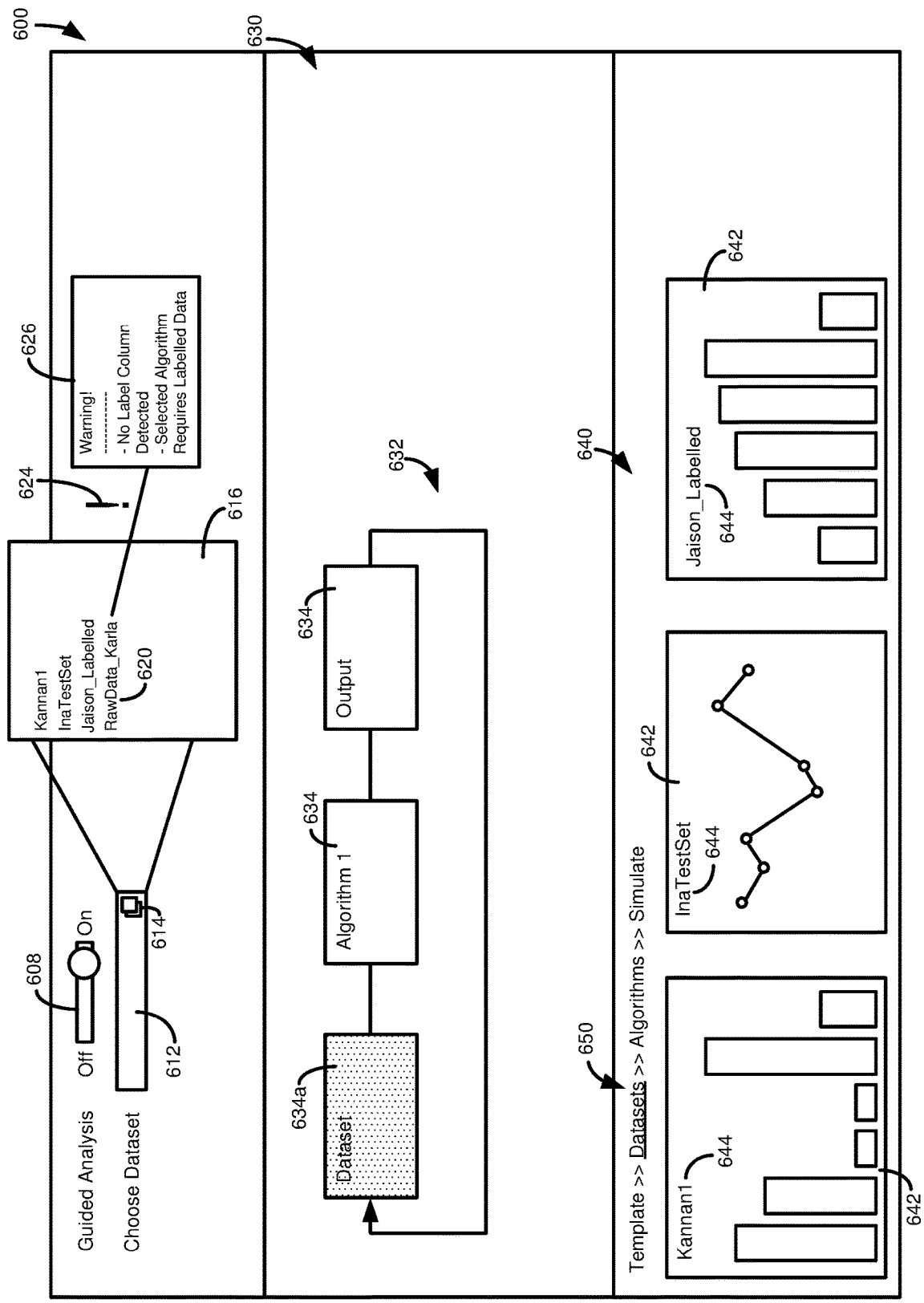
Figure 7:
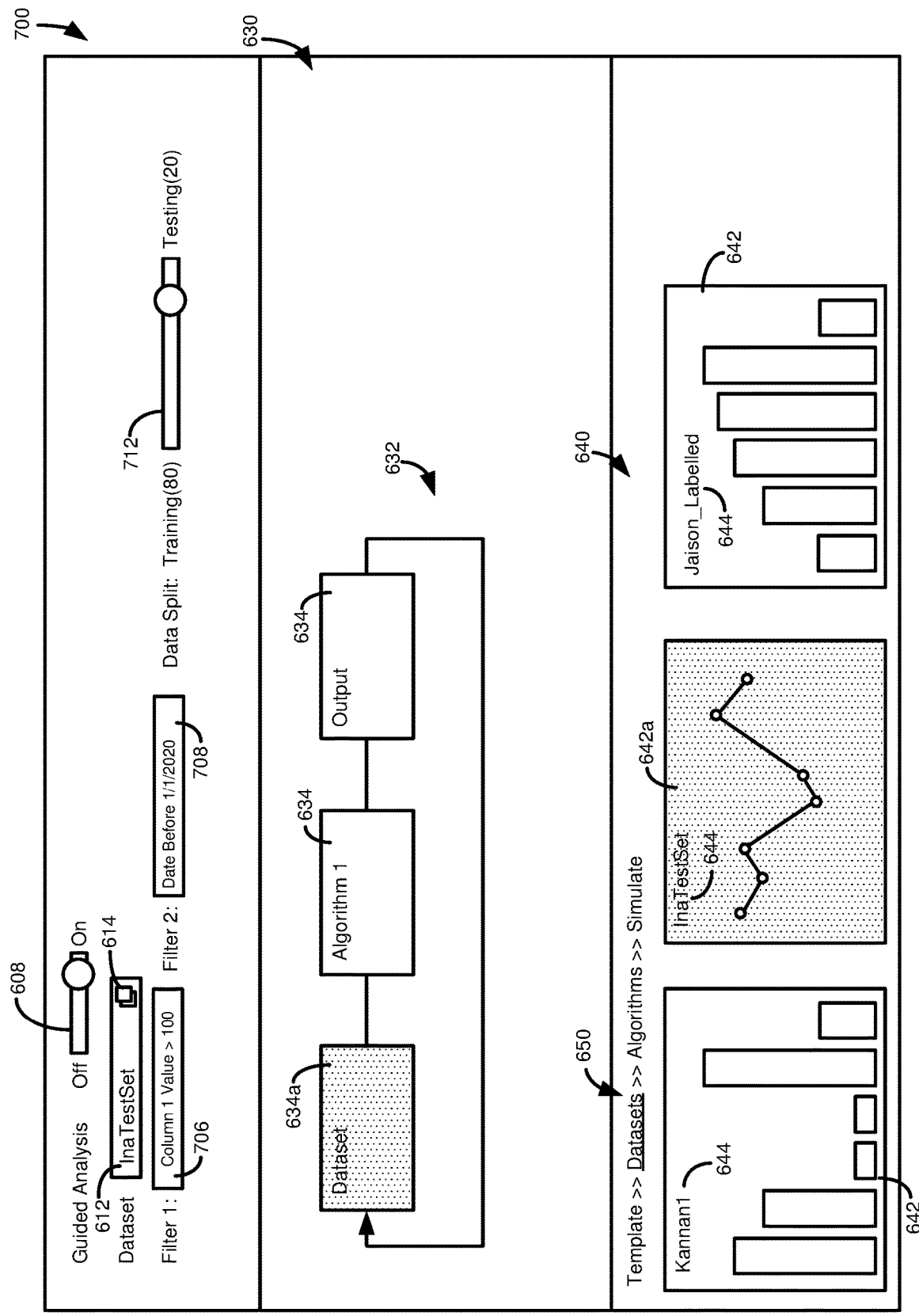

The screen 600 of FIG. 6 can allow a user to select a data set to be processed with a machine learning task, such as being specified as a data set to be used with an instance of a machine learning model 128 of FIG. 1. The screen 600 can be presented to a user after the screen 500 has been completed, or based on other input, such as by selecting the appropriate navigation link 530 of FIG. 5, or a navigation link provided on another of the user interface screens described in this Example.

The screen 600 can include a user interface control 608 that allows a user to select whether to use a guided analysis, such as according to a disclosed technology, or whether, for example, the user wishes to manually define a machine learning task. In a particular example, if a user selects to exit a guided mode from the screen 600, the screen 600 may continue to be used, but guidance or constraints that would be provided in guided mode are not displayed, or are not enforced. Similarly, exiting guided mode from the screen 600 may cause guidance or constraints to not be displayed or enforced if the user navigates to another of the screens 700, 800, 900, or if the user returns to the screen 500.

A user interface control 612 can allow a user to select a data set for use. For example, a browse control 614 can allow a user to select or browse a repository of data sets. Window 616 shows a list of available data sets (e.g., in a repository currently being browsed). In some cases, a guidance framework, such as the guidance framework 108 of FIG. 1, can filter data sets so that only data sets that comply with a selected machine learning model, including based on any prior specific configurations made to an instance of such model. In other cases, a greater number of data sets can be shown, including non-compatible data sets. However, indications or warnings can be provided if a data set is not compatible with an instance of a machine learning model that is being configured. As shown, for example, data set 620 has been determined not to comply with the instance of the machine learning model being configured by the user. A warning indicator 624 is displayed, and a window 626 provides an explanation for the warning. Typically, when a guided mode is selected, a user is not permitted to select data sets that a guidance framework determines to be incompatible. In other cases, warnings are provided, but the user is not prohibited from selecting what may be incompatible data sets (even though a machine learning task may later fail). Or, warnings can be classified as critical or non-critical, where a non-critical warning can indicate a potential problem (e.g., a data set not having enough data to provide reliable results), but does not prevent selection of the data set, while a critical warning, such as data being in an incompatible format, can result in the flagged data set not being selectable.

The screen 600 is shown as including a model visualization window or panel 630. Once a machine learning model has been selected, a visual model representation 632 can be displayed in the window 630. The visual model representation 632 can allow a user to view all elements of the machine learning model even if a particular user interface screen only relates to a particular element of the model. As discussed above, providing this contextual information can facilitate model configuration, reduce user frustration, and help train users so that they may consider using more complex models (e.g., by classifying themselves as a more sophisticated user, so that they will be presented with more options).

The visual model representation 632 can identify one or more machine learning model components that are currently active, such as if the screen 600 allows a user to configure such components. For example, as the screen 600 relates to data set selection, the data set component 634a of the visual representation 632 can be highlighted or otherwise displayed in a visually distinguished manner. In some cases, a user can move to different workflow steps by selecting different components 634 of the visual representation 632. Or, a user may be provided with details regarding a particular machine learning model component 634 when the model is selected (e.g., if an algorithm component is selected, the name of the algorithm and algorithm settings can be displayed).

A preview panel or window 640 can display information related to data sets, such as data sets available for selection using the window 616. As shown, the panel 640 includes data set representations 642, where a representation includes a name or identifier 644 of the data set and a visual depiction or summary of data in the data set, such as a bar graph, line graph, or other type of data visualization.

The screen 600 can include navigation options 650, which can be implemented at least generally as described for the navigation links 530 of FIG. 5.

The screen 700 can be displayed to the user once the screen 600 has been completed, when the user selects an appropriate navigation option from another screen, or at least after the user has selected a data set using the user interface control 612 of FIG. 6. Elements of the screen 600 that are reused in the screen 700 retain the reference numbers used in the description of FIG. 6.

Once a data set is selected, a user may be presented with additional options for the data set. In some cases, these additional options can be represented as sub-objects, sub-entities, or sub-components in a machine learning model. In other cases, the additional options may be associated with a more primary object, entity, or component, or at least not visually distinguished as being associated with a sub-entity or sub-component. The additional options can include options to filter or otherwise process or select data in a data set. For example, the screen 700 is shown as including a first filter field 706, which has been set to select data elements (e.g., database records) having a value of greater than 100 in a first column. A second filter field 708 is shown as restricting data elements to those associated with a particular date.

The additional options can include options specific to a particular algorithm, use case, or problem type. For example, for machine learning techniques that require training data, a user can use a slider control element 712 to select a split of data in the data set, where a first portion can be used for training data and a second portion used for validation. Or, the second portion may be used for analysis or classification (e.g., the second portion of data may be analyzed using the model trained using the first portion of the data).

Note that, as a data set has been selected, the data set representation 642a for the selected data set is displayed in a visually distinguishable manner, such as being highlighted or being displayed in a different color or style than representations 642 of unselected data sets.

Figure 8:
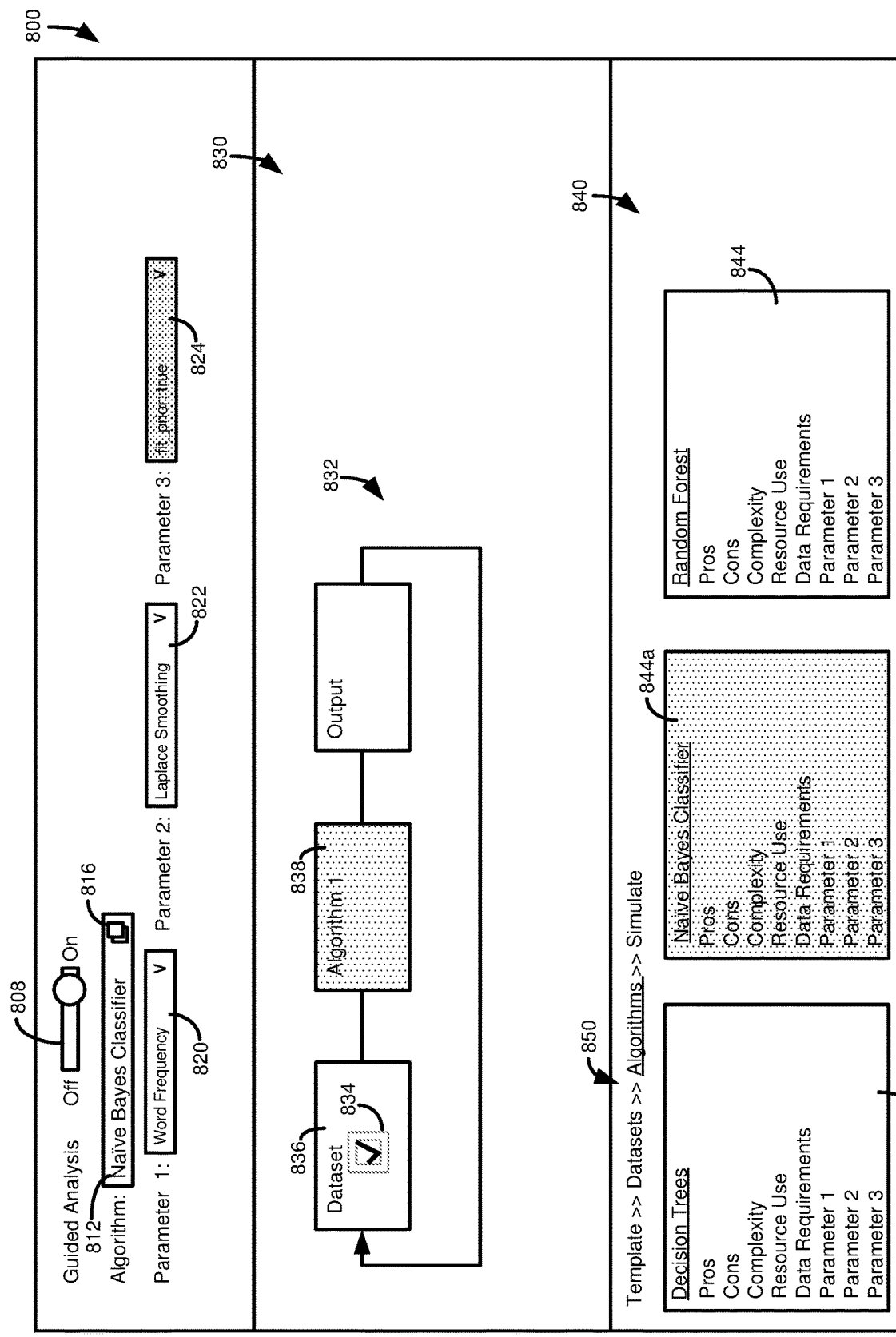

The screen 800 of FIG. 8 can allow a user to select, and optionally configure elements of, an algorithm to be used in the instance of the machine learning model being configured. The screen 800 can include a user interface control 808 that allows a user to select whether to use a guided analysis, such as according to a disclosed technology, or whether, for example, the user wishes to manually define a machine learning task. In a particular example, if a user selects to exit a guided mode from the screen 800, the screen 800 may continue to be used, but guidance or constraints that would be provided in guided mode are not displayed, or are not enforced. Similarly, exiting guided mode from the screen 800 may cause guidance or constraints to not be displayed or enforced if the user navigates to another of the screens 500, 600, 700, or 900.

The user can select an algorithm in field 812. The field 812 can be associated with a browse control element 816, which can display to a user a list of available algorithms. The list of available algorithms can be constrained, such as based on a level (e.g., an experience or complexity level) selected by a user, such as in the screen 500, a particular problem or use case selected by the user, or other factors. For example, a data set selected using the screens 600/700 can, at least in some cases, limit algorithms that can be selected for the field 812 to those that are consistent with the selected data set.

Once an algorithm is selected, additional user interface controls can be displayed that either allow a user to configure various settings for the algorithm, or which display settings to the user, even if the user may not change the value assigned to the setting, such as if the setting is only changeable for more experienced users (or otherwise associated with a level that indicates additional complexity is to be provided in a machine learning model). In the particular example shown, a Naive Bayes Classifier has been selected in field 812 as the algorithm to be used. Based on that selection, fields 820, 822, 824 for three parameters of the Naive Bayes Classifier are shown. Field 820 can relate to a way of converting textual features to numerical input that can be processed by the Naive Bayes algorithm, and indicates that word frequency is to be used. Field 822 relates to a smoothing technique to be used, and shows that Laplace smoothing has been selected. Field 824 denotes whether probabilities for new cases should be affected by probabilities determined by cases analyzed to date. Field 824 can be highlighted or otherwise visually distinguished to indicate that is not available for selection by a user (at least given a current level set for or by the user).

The screen 800 can include a model visualization panel 830, which can be at least generally similar to the model visualization panel 630 of FIG. 6. A visual representation 832 of the machine learning model includes a visual indication 834, such as a check mark, for a data set component 836, indicating that this component has been configured by the user. A representation 838 of the algorithm component of the machine learning model is highlighted or otherwise visually distinguished to indicate that it is active/associated with the screen 800.

The screen 800 can include a preview panel or window 840, which can be at least similar to the preview panel or window 630 of FIG. 6. Preview panels or windows of the user interface screens of this Example are generally context sensitive, as is a portion of the screens that provides configuration options (e.g., the portion with the fields 812, 820, 822, 824). Accordingly, the preview window 840 provides additional information regarding algorithms that are available for selection in the field 812. A representation 844 of an algorithm displayed in the preview window 840 can provide information such as pros and cons of using the algorithm (for example, easy to understand output, high computing resource use), complexity of the algorithm (which could be computational complexity, interpretation complexity, complexity of configuration settings, or other measures of complexity), a relative description of computing resources used by the algorithm, any specific data requirements (e.g., numeric data, a minimum number of data points, labelled data, a training data set, etc.), and identifiers of any setting associated with the algorithm, or at least settings that are available for user configuration.

The screen 800 can highlight or otherwise distinguish a representation 844 (e.g., 844a, as shown), for a currently selected algorithm. The screen can include navigation options 850, which can be at least similar to the navigation links 530 of FIG. 5.

Figure 9:
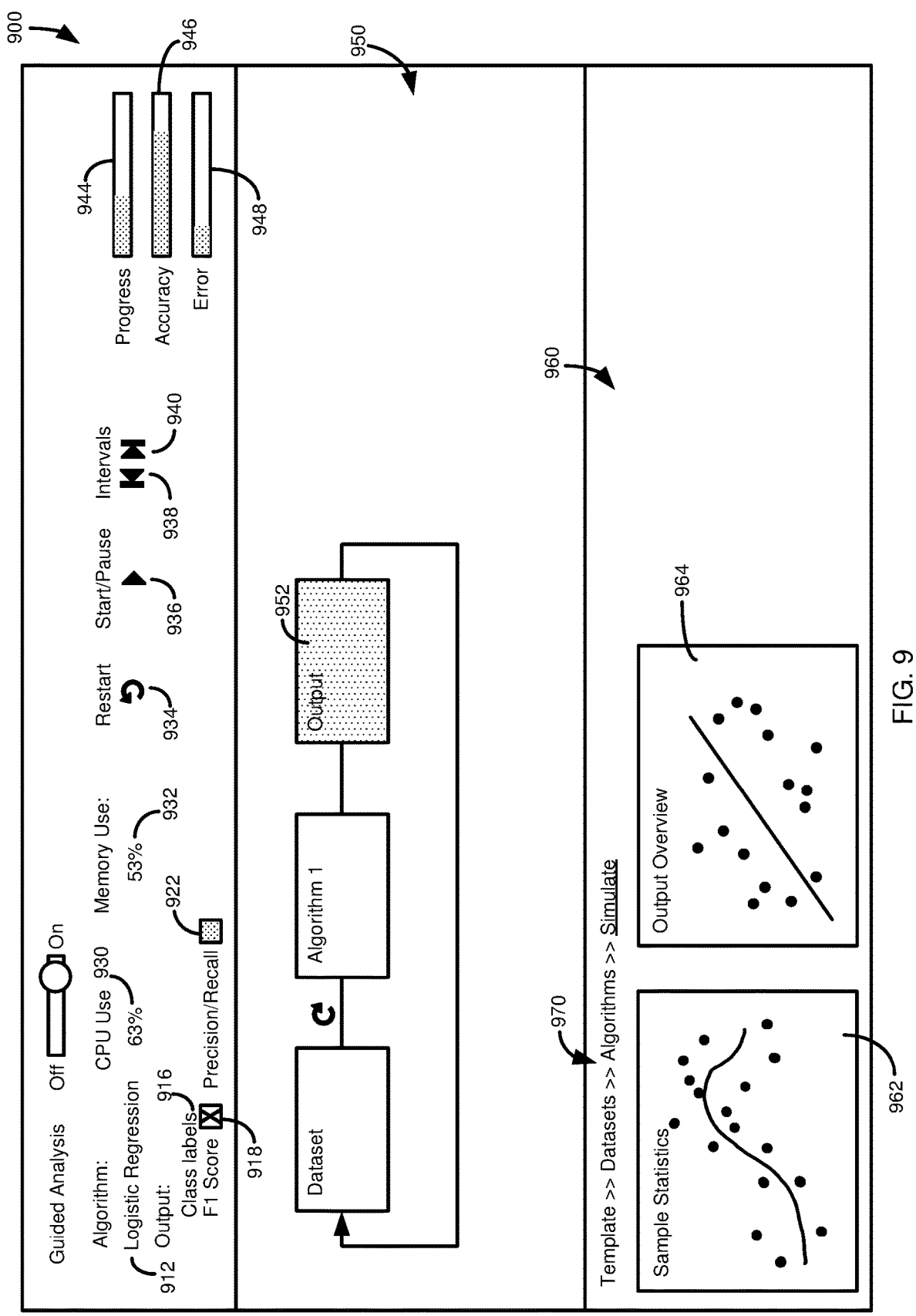

The screen 900 of FIG. 9 can be used to start, or view the status of, a machine learning task configured at least in part using the screens 500-800. The screen 900 can include an identifier 912 of the algorithm being used, such as k-means clustering, as shown. The screen 900 can also be used to select output parameters that will be used in providing or processing results of the algorithm. For example, the k-means clustering algorithm may provide class label output 916 as a default option. A user optionally may select to include the F1 score in the output results by selecting user interface control 918. The F1 score can be based on the precision and recall factors, which can be associated with a user interface control 922. As shown, the control 922 is not available for selection by the user, such as because this output setting is associated with a user/complexity level that is higher/more complex than a level selected by or for a current user.

The screen 900 can also be used to provide information regarding a machine learning task that is being executed, or to control the execution of the task. For example, indicators 930, 932 can provide indicators of CPU and memory use, respectively. Controls 934, 936 can be used to restart or pause/resume a task, respectively. Controls 938, 940 can be used, respectively, to increase or decrease a prediction or confidence interval to be used with results of the algorithm.

The screen 900 can provide additional details regarding the execution of a machine learning task. For example, a progress bar 944 can indicate progress in completing the machine learning task. Bars 946, 948 can be used, respectively, to provide information regarding the accuracy and error associated with the algorithm at the completion degree indicated in the progress bar 944.

The screen 900 can include a model visualization panel 950, which can be at least generally similar to the model visualization panel 630 of FIG. 6. A representation 952 of the output component of a machine learning model can be highlighted or otherwise visually distinguished to indicate that it is active/associated with the screen 900.

A preview window or panel 960 can provide details regarding algorithm output settings or execution. As shown, the preview window 960 includes a representation 962 of statistics calculated based on data in the data set, and a representation 964 of the output of the algorithm based on the level of progress indicated by the progress bar 944. The screen 900 can include navigation options 970, which can be at least generally similar to the navigation links 530 of FIG. 5.

Example 7—Example Implementations

Figure 10:
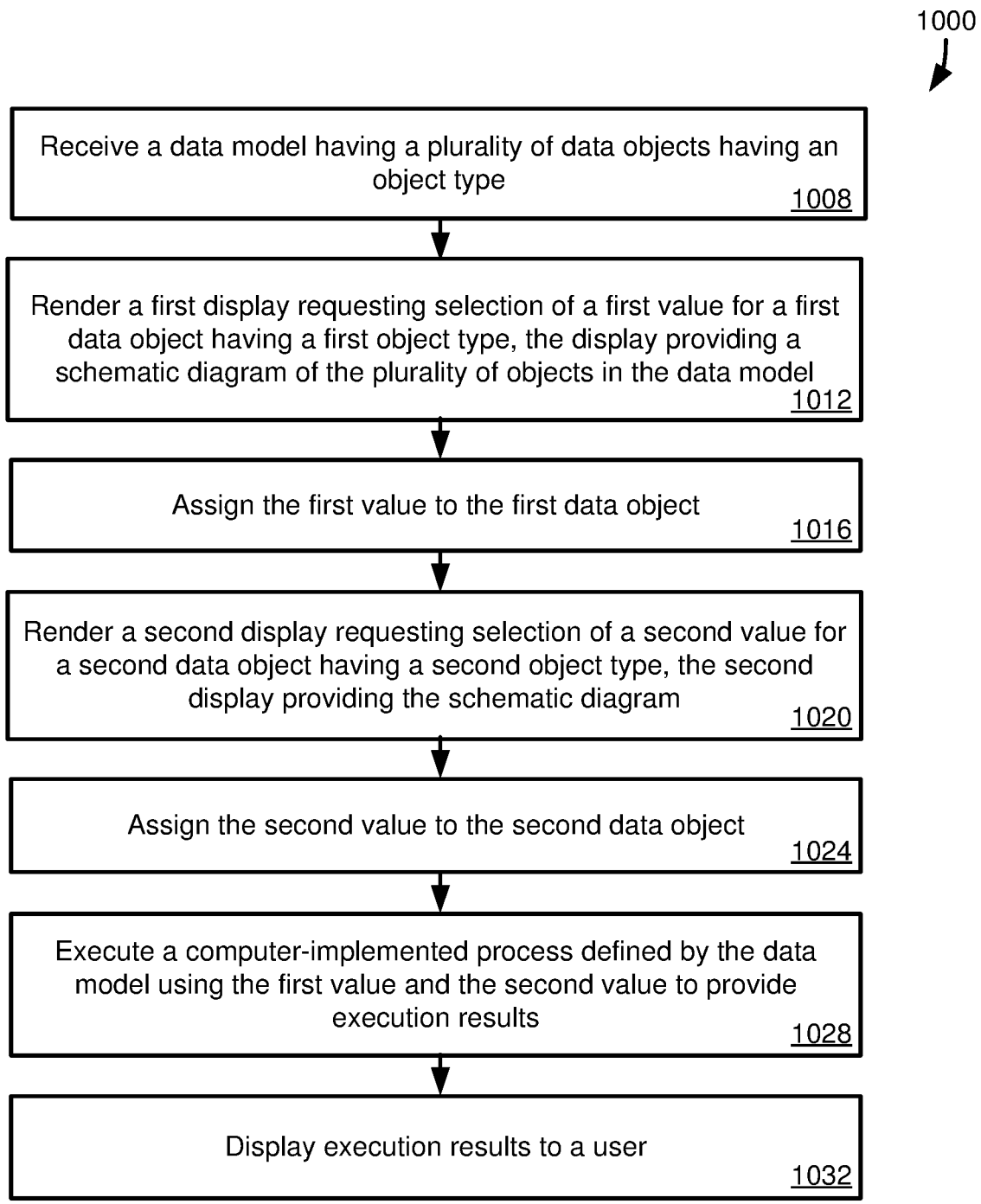
FIGS. 10 and 11 are flowcharts of example methods for configuring and executing a computer-implemented task represented by a data model.

FIG. 10 is a flowchart of a method 1000 for configuring and executing a computer-implemented process defined by a data model. The method 1000 can be carried out in the computing environment 100 of FIG. 1. At 1008, a data model is received that includes a plurality of data objects. Each data object has an object type. A first display is rendered at 1012, requesting selection of a first value for a first data object having a first data object type. The first display also provides a schematic diagram of the plurality of data objects in the data model. The first value is assigned to the first data object at 1016. At 1020, a second display is rendered requesting selection of a second value for a second data object having a second data object type. The second display also provides the schematic diagram. The second value is assigned to the second data object at 1024. At 1028, a computer-implemented process defined by the data model is executed using the first value and the second value to provide execution results. The execution results are displayed to a user at 1032.

Figure 11:
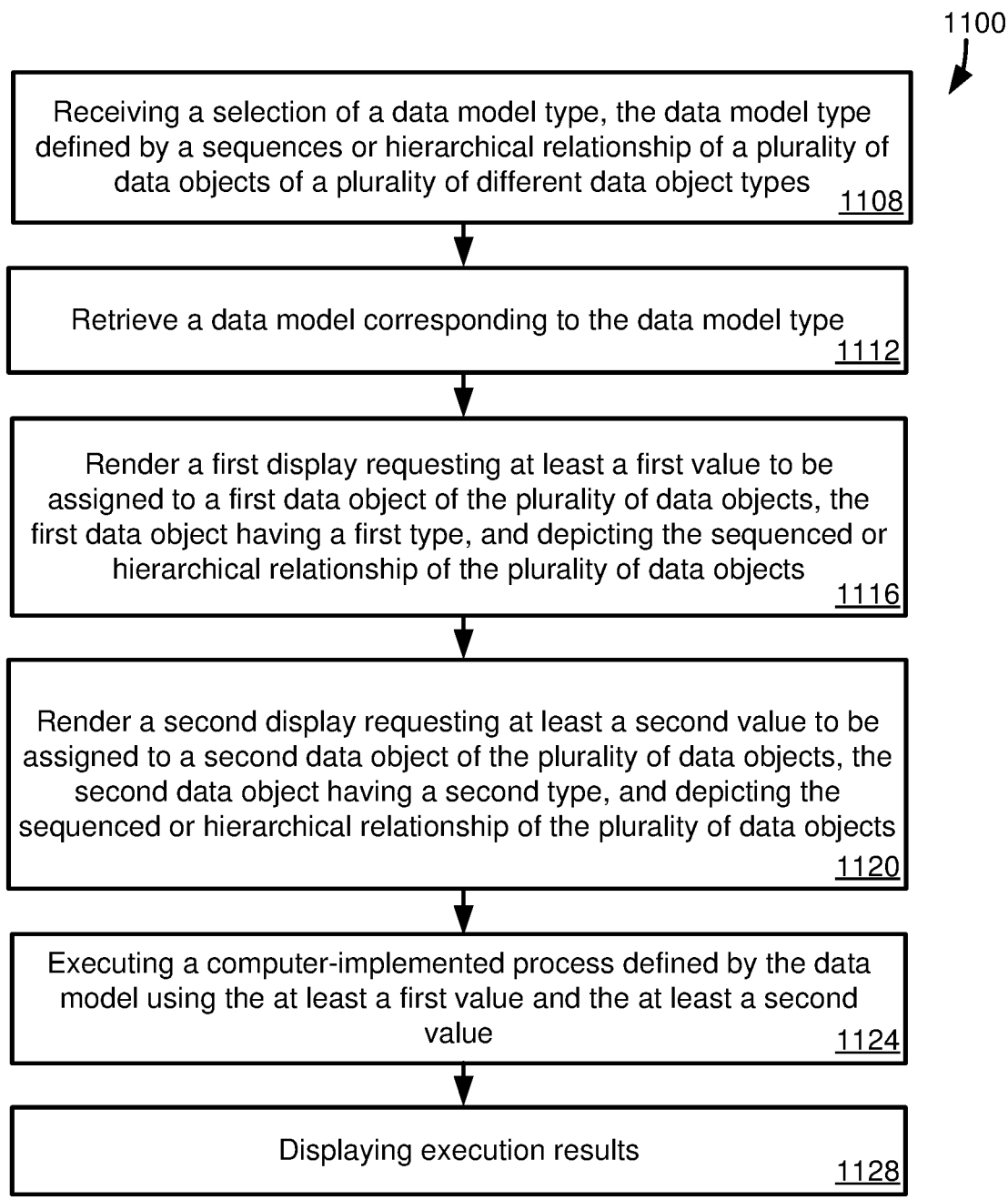

FIG. 11 is a flowchart of a method 1100 for configuring and executing a computer-implemented process defined by a data model. The method 1100 can be carried out in the computing environment 100 of FIG. 1. At 1108, a selection of a data model type is received. The data model type is defined by a sequenced or hierarchical relationship of a plurality of data objects of a plurality of different data object types. A data model corresponding to the data model type is retrieved at 1112. At 1116, a first display is rendered requesting at least a first value to be assigned to a first data object of the plurality of data objects. The first data object has a first type. The first display depicts the sequenced or hierarchical relationship of the plurality of data objects. A second display is rendered at 1120. The second display requests at least a second value to be assigned to a second data object of the plurality of data objects. The second data object has a second type. The second display depicts the sequenced or hierarchical relationship of the plurality of data objects. At 1124, a computer-implemented process defined by the data model is executed using the at least a first value and the at least a second value. Execution results are displayed at 1128.

Figure 12:
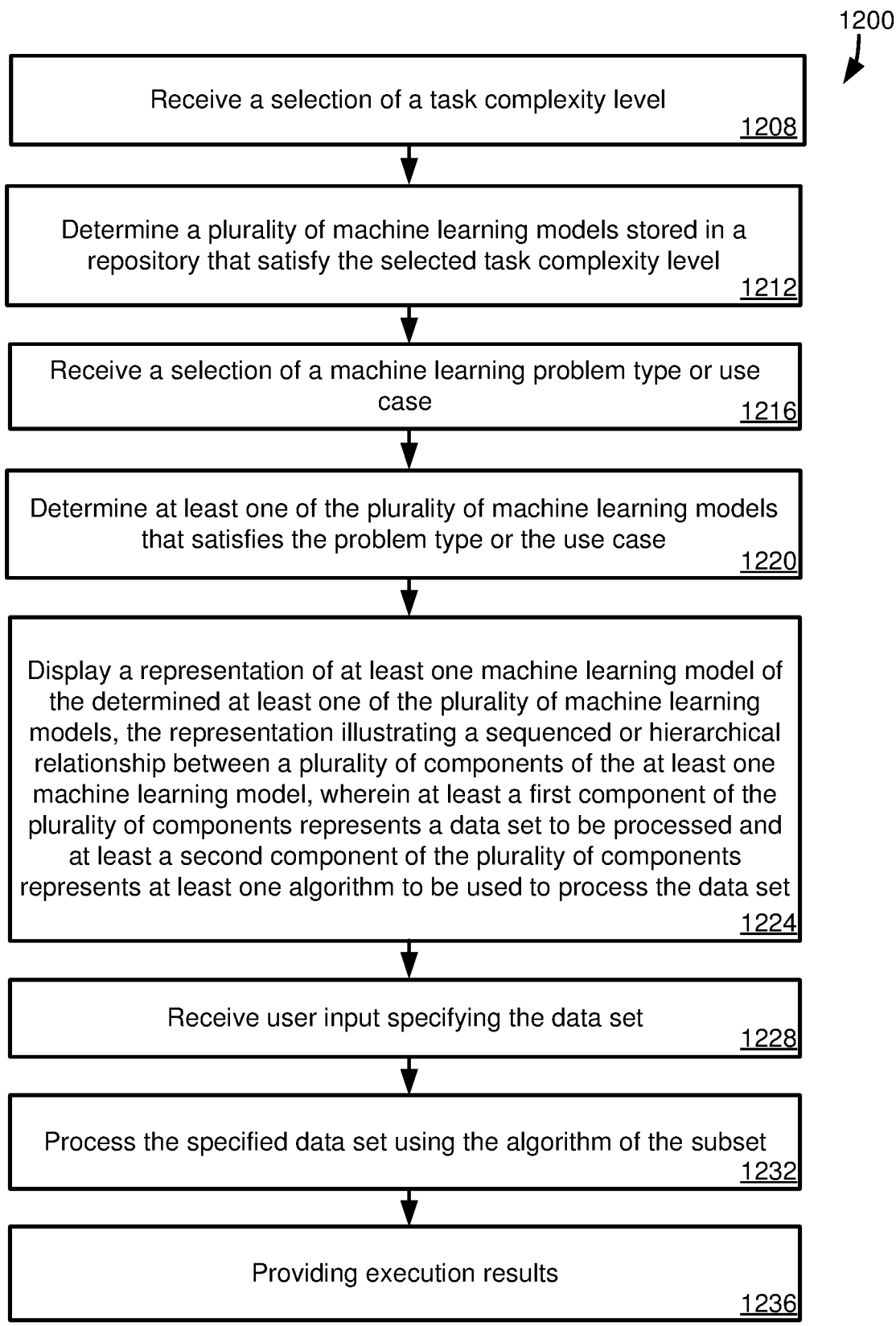
FIG. 12 is a flowchart of an example method for configuring and executing a machine learning model.

FIG. 12 is a flowchart of a method 1200 for configuring and executing a machine learning model. The method 1200 can be carried out in the computing environment 100 of FIG. 1. A selection of a task level is received at 1208. At 1212, a plurality of machine learning models, stored in a repository, are determined that satisfy the selected task level. A selection of a machine learning problem type or a use case is received at 1216. At 1220, at least one of the plurality of machine learning models that satisfies the problem type or the use case is determined. A representation of the at least one machine learning model is displayed at 1224. The representation illustrates a sequenced or hierarchical relationship between a plurality of components of the at least one machine learning model. At least a first component of the plurality of components represents a data set to be processed and at least a second component of the plurality of components represents at least one algorithm to be used to process the data set. At 1228, input specifying the data set is received. The specified data set is processed using an algorithm of the subset at 1232. Execution results are provided at 1236.

Example 8—Computing Systems

Figure 13:
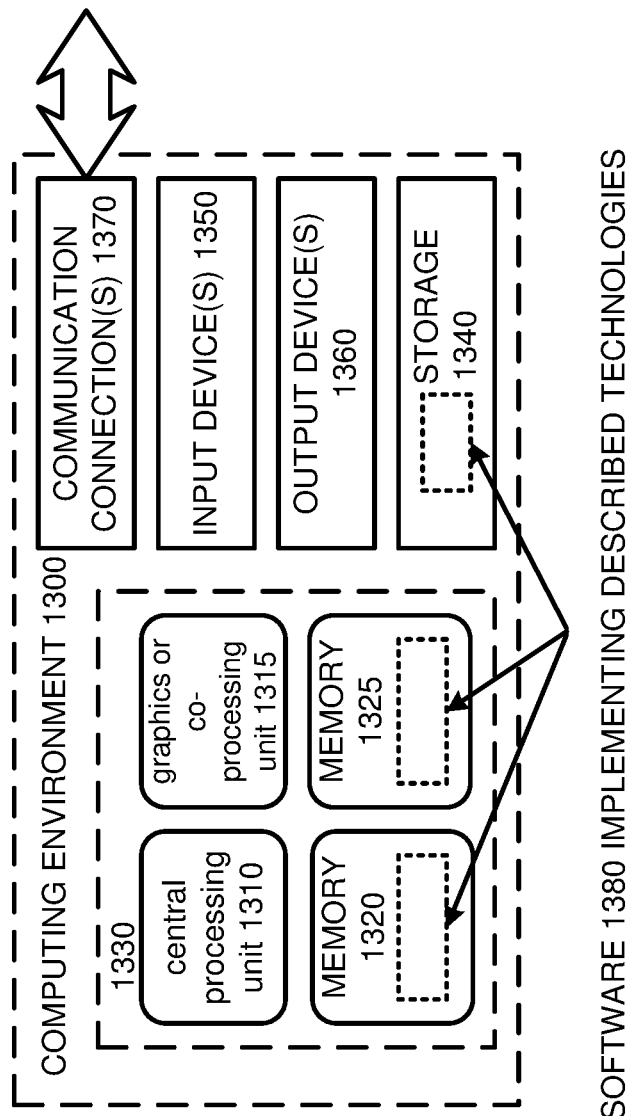
FIG. 13 is a diagram of an example computing system in which some described embodiments can be implemented.

FIG. 13 depicts a generalized example of a suitable computing system 1300 in which the described innovations may be implemented. The computing system 1300 is not intended to suggest any limitation as to scope of use or functionality of the present disclosure, as the innovations may be implemented in diverse general-purpose or special-purpose computing systems.

With reference to FIG. 13, the computing system 1300 includes one or more processing units 1310, 1315 and memory 1320, 1325. In FIG. 13, this basic configuration 1330 is included within a dashed line. The processing units 1310, 1315 execute computer-executable instructions, such as for implementing components of the environment 100 of FIG. 1, including as described in Examples 1-7. A processing unit can be a general-purpose central processing unit (CPU), processor in an application-specific integrated circuit (ASIC), or any other type of processor. In a multi-processing system, multiple processing units execute computer-executable instructions to increase processing power. For example, FIG. 13 shows a central processing unit 1310 as well as a graphics processing unit or co-processing unit 1315. The tangible memory 1320, 1325 may be volatile memory (e.g., registers, cache, RAM), non-volatile memory (e.g., ROM, EEPROM, flash memory, etc.), or some combination of the two, accessible by the processing unit(s) 1310, 1315. The memory 1320, 1325 stores software 1380 implementing one or more innovations described herein, in the form of computer-executable instructions suitable for execution by the processing unit(s) 1310, 1315.

A computing system 1300 may have additional features. For example, the computing system 1300 includes storage 1340, one or more input devices 1350, one or more output devices 1360, and one or more communication connections 1370. An interconnection mechanism (not shown) such as a bus, controller, or network interconnects the components of the computing system 1300. Typically, operating system software (not shown) provides an operating environment for other software executing in the computing system 1300, and coordinates activities of the components of the computing system 1300.

The tangible storage 1340 may be removable or non-removable, and includes magnetic disks, magnetic tapes or cassettes, CD-ROMs, DVDs, or any other medium which can be used to store information in a non-transitory way and which can be accessed within the computing system 1300. The storage 1340 stores instructions for the software 1380 implementing one or more innovations described herein.

The input device(s) 1350 may be a touch input device such as a keyboard, mouse, pen, or trackball, a voice input device, a scanning device, or another device that provides input to the computing system 1300. The output device(s) 1360 may be a display, printer, speaker, CD-writer, or another device that provides output from the computing system 1300.

The communication connection(s) 1370 enable communication over a communication medium to another computing entity. The communication medium conveys information such as computer-executable instructions, audio or video input or output, or other data in a modulated data signal. A modulated data signal is a signal that has one or more of its characteristics set or changed in such a manner as to encode information in the signal. By way of example, and not limitation, communication media can use an electrical, optical, RF, or other carrier.

The innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing system.

The terms "system" and "device" are used interchangeably herein. Unless the context clearly indicates otherwise, neither term implies any limitation on a type of computing system or computing device. In general, a computing system or computing device can be local or distributed, and can include any combination of special-purpose hardware and/or general-purpose hardware with software implementing the functionality described herein.

In various examples described herein, a module (e.g., component or engine) can be "coded" to perform certain operations or provide certain functionality, indicating that computer-executable instructions for the module can be executed to perform such operations, cause such operations to be performed, or to otherwise provide such functionality. Although functionality described with respect to a software component, module, or engine can be carried out as a discrete software unit (e.g., program, function, class method), it need not be implemented as a discrete unit. That is, the functionality can be incorporated into a larger or more general purpose program, such as one or more lines of code in a larger or general purpose program.

For the sake of presentation, the detailed description uses terms like "determine" and "use" to describe computer operations in a computing system. These terms are high-level abstractions for operations performed by a computer, and should not be confused with acts performed by a human being. The actual computer operations corresponding to these terms vary depending on implementation.

Example 9—Cloud Computing Environment

Figure 14:
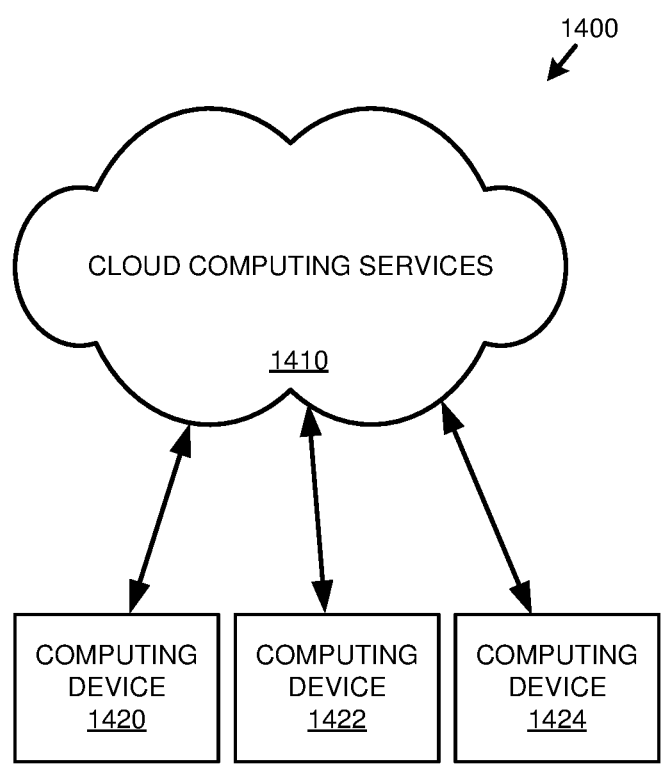
FIG. 14 is an example cloud computing environment that can be used in conjunction with the technologies described herein.

FIG. 14 depicts an example cloud computing environment 1400 in which the described technologies can be implemented. The cloud computing environment 1400 comprises cloud computing services 1410. The cloud computing services 1410 can comprise various types of cloud computing resources, such as computer servers, data storage repositories, networking resources, etc. The cloud computing services 1410 can be centrally located (e.g., provided by a data center of a business or organization) or distributed (e.g., provided by various computing resources located at different locations, such as different data centers and/or located in different cities or countries).

The cloud computing services 1410 are utilized by various types of computing devices (e.g., client computing devices), such as computing devices 1420, 1422, and 1424. For example, the computing devices (e.g., 1420, 1422, and 1424) can be computers (e.g., desktop or laptop computers), mobile devices (e.g., tablet computers or smart phones), or other types of computing devices. For example, the computing devices (e.g., 1420, 1422, and 1424) can utilize the cloud computing services 1410 to perform computing operators (e.g., data processing, data storage, and the like).

Example 10—Implementations

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed methods can be used in conjunction with other methods.

Any of the disclosed methods can be implemented as computer-executable instructions or a computer program product stored on one or more computer-readable storage media, such as tangible, non-transitory computer-readable storage media, and executed on a computing device (e.g., any available computing device, including smart phones or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 13, computer-readable storage media include memory 1320 and 1325, and storage 1340. The term computer-readable storage media does not include signals and carrier waves. In addition, the term computer-readable storage media does not include communication connections (e.g., 1370).

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network (such as a cloud computing network), or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in C, C++, C #, Java, Perl, JavaScript, Python, Ruby, ABAP, SQL, XCode, GO, Adobe Flash, or any other suitable programming language, or, in some examples, markup languages such as html or XML, or combinations of suitable programming languages and markup languages. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, and infrared communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and sub combinations with one another. The disclosed methods, apparatus, and systems are not limited to any specific aspect or feature or combination thereof, nor do the disclosed embodiments require that any one or more specific advantages be present or problems be solved.

The technologies from any example can be combined with the technologies described in any one or more of the other examples. In view of the many possible embodiments to which the principles of the disclosed technology may be applied, it should be recognized that the illustrated embodiments are examples of the disclosed technology and should not be taken as a limitation on the scope of the disclosed technology. Rather, the scope of the disclosed technology includes what is covered by the scope and spirit of the following claims.

What is claimed is:

1. A computing system comprising:
memory;
one or more processing units coupled to the memory; and
one or more non-transitory computer readable storage media storing instructions that, when executed, cause the computing system to perform operations comprising:
receiving a selection of a user level to provide a selected user level;
determining a first portion of a plurality of data models available for selection by users having the selected user level;
displaying at least a second portion of the first portion of the plurality of data models to a user;
receiving a selection of a problem type;
determining a third portion of data models having identifiers indicating they are associated with the problem type;
displaying at least a fourth portion of the third portion of the plurality of data models to the user;
receiving a data model comprising a plurality of data objects, each data object having an object type;
rendering a first display requesting selection of a first value for a first data object having a first object type and providing a schematic diagram of the plurality of data objects in the data model;
assigning the first value to the first data object;
rendering a second display requesting selection of a second value for a second data object having a second object type and providing the schematic diagram;
assigning the second value to the second data object;
executing a computer-implemented process defined by the data model using the first value and the second value to provide execution results; and
displaying the execution results to a user.

2. The computing system of claim 1, wherein the data model represents a machine learning process and the first object type represents a data set.

3. The computing system of claim 2, wherein the second object type represents a machine learning algorithm.

4. The computing system of claim 1, wherein the data model represents a machine learning process and the first value is constrained to a first set of values specified for the machine learning process.

5. The computing system of claim 4, wherein the data model is a first data model selected from a plurality of data models and the machine learning process is a first machine learning process, a second data model of the plurality of data models representing a second machine learning process and a third value for a first data object of the second data model is constrained to a second set of values specified for the second machine learning process, wherein the second set of values has at least one member that differs from members of the first set of values.

6. The computing system of claim 1, wherein the data model is a first data model and is associated with a first problem type and a first user level and is selected from a plurality of data models, the plurality of data models having at least a second data model associated with the first problem type and associated with a second user level, and wherein the second data object is of the first object type and has at least one sub-object type that is configurable by a user and is not configurable by the user in the first data model.

7. A method, implemented in a computing system comprising a memory and one or more hardware processors, comprising:
   receiving a selection of a user level to provide a selected user level;
   determining a first portion of a plurality of data models available for selection by users having the selected user level;
   displaying at least a second portion of the first portion of the plurality of data models to a user;
   receiving a selection of a problem type;
   determining a third portion of the second portion of the plurality of data models having identifiers indicating they are associated with the problem type;
   displaying at least a fourth portion of the third portion of the second portion of the plurality of data models to the user;
   receiving a data model comprising a plurality of data objects, each data object having an object type;
   rendering a first display requesting selection of a first value for a first data object having a first object type and providing a schematic diagram of the plurality of data objects in the data model;
   assigning the first value to the first data object;
   rendering a second display requesting selection of a second value for a second data object having a second object type and providing the schematic diagram;
   assigning the second value to the second data object;
   executing a computer-implemented process defined by the data model using the first value and the second value to provide execution results; and
   displaying the execution results to a user.

8. The method of claim 7, wherein the data model represents a machine learning process and the first object type represents a data set.

9. The method of claim 8, wherein the second object type represents a machine learning algorithm.

10. The method of claim 7, wherein the data model represents a machine learning process and the first value is constrained to a first set of values set for the machine learning process.

11. The method of claim 10, wherein the data model is a first data model selected from a plurality of data models and the machine learning process is a first machine learning process, a second data model of the plurality of data models representing a second machine learning process and a third value for a first data object of the second data model is constrained to a second set of values set for the second machine learning process, wherein the second set of values has at least one member that differs from members of the first set of values.

12. The method of claim 7, wherein the data model is a first data model and is associated with a first problem type and a first user level and is selected from a plurality of data models, the plurality of data models having at least a second data model associated with the first problem type and associated with a second user level, and wherein the second data object is of the first object type and has at least one sub-object type that is configurable by a user and is not configurable by the user in the first data model.

13. One or more tangible computer-readable storage media comprising:
   computer-executable instructions that, when executed by a computing system comprising one or more hardware processors and at least one memory, cause the computing system to receive a data model comprising a plurality of data objects, each data object having an object type;
   computer-executable instructions that, when executed by the computing system, cause the computing system to render a first display requesting selection of a first value for a first data object having a first object type and providing a schematic diagram of the plurality of data objects in the data model;
   computer-executable instructions that, when executed by the computing system, cause the computing system to assign the first value to the first data object;
   computer-executable instructions that, when executed by the computing system, cause the computing system to render a second display requesting selection of a second value for a second data object having a second object type and providing the schematic diagram;
   computer-executable instructions that, when executed by the computing system, cause the computing system to assign the second value to the second data object;
   computer-executable instructions that, when executed by the computing system, cause the computing system to execute a computer-implemented process defined by the data model using the first value and the second value to provide execution results; and
   computer-executable instructions that, when executed by the computing system, cause the computing system to display the execution results to a user;
   wherein the data model is a first data model and is associated with a first problem type and a first user level and is selected from a plurality of data models, the plurality of data models having at least a second data model associated with the first problem type and associated with a second user level, and wherein the second data object is of the first object type and has at least one sub-object type that is configurable by a user and is not configurable by the user in the first data model.

14. The one or more tangible computer-readable storage media of claim 13, wherein the data model represents a machine learning process and the first object type represents a data set.

15. The one or more tangible computer-readable storage media of claim 14, wherein the second object type represents a machine learning algorithm.

16. The one or more tangible computer-readable storage media of claim 13, wherein the data model represents a machine learning process and the first value is constrained to a first set of values set for the machine learning process.

17. The one or more tangible computer-readable storage media of claim 16, wherein the data model is a first data model selected from a plurality of data models and the machine learning process is a first machine learning process, a second data model of the plurality of data models representing a second machine learning process and a third value for a first data object of the second data model is constrained to a second set of values set for the second machine learning process, wherein the second set of values has at least one member that differs from members of the first set of values.

18. The one or more tangible computer-readable storage media of claim 13, further comprising:
- computer-executable instructions that, when executed by the computing system, cause the computing system to receive a selection of a user level;
- computer-executable instructions that, when executed by the computing system, cause the computing system to determine a first portion of a plurality of data models available for selection by users having the selected user level;
- computer-executable instructions that, when executed by the computing system, cause the computing system to display at least a second portion of the first portion of the plurality of data models to a user;
- computer-executable instructions that, when executed by the computing system, cause the computing system to receive a selection of a problem type;
- computer-executable instructions that, when executed by the computing system, cause the computing system to determine a third portion of the plurality of data models having identifiers indicating they are associated with the problem type; and
- computer-executable instructions that, when executed by the computing system, cause the computing system to display at least a fourth portion of the third portion of the plurality of data models to a user.

19. The computing system of claim 3, wherein machine learning algorithms available for the second object type are constrained by the problem type.

20. The computing system of claim 3, wherein machine learning algorithms available for the second object type are constrained by the user level.

* * * * *